US 12,498,540 B2

(12) United States Patent
Endo et al.

(10) Patent No.: US 12,498,540 B2
(45) Date of Patent: Dec. 16, 2025

(54) DRIVE DEVICE AND IMAGING APPARATUS

(71) Applicant: FUJIFILM Corporation, Tokyo (JP)

(72) Inventors: Azuchi Endo, Saitama (JP); Masahiko Miyata, Saitama (JP); Masahiro Hideshima, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 325 days.

(21) Appl. No.: 18/166,182

(22) Filed: Feb. 8, 2023

(65) Prior Publication Data
US 2023/0251457 A1   Aug. 10, 2023

(30) Foreign Application Priority Data

Feb. 8, 2022   (JP) .................................. 2022-018069

(51) Int. Cl.
*G02B 7/10*   (2021.01)
*G02B 7/28*   (2021.01)
*H02N 2/02*   (2006.01)
*H02N 2/14*   (2006.01)

(52) U.S. Cl.
CPC ............. *G02B 7/102* (2013.01); *G02B 7/282* (2013.01); *H02N 2/026* (2013.01); *H02N 2/142* (2013.01)

(58) Field of Classification Search
CPC ................................ G02B 7/102; G02B 7/282
See application file for complete search history.

(56) References Cited

U.S. PATENT DOCUMENTS

| 2007/0040475 | A1  | 2/2007 | Namikawa |             |
|--------------|-----|--------|----------|-------------|
| 2010/0045139 | A1* | 2/2010 | Yoshida  | H02N 2/067  |
|              |     |        |          | 310/317     |
| 2018/0331634 | A1* | 11/2018| Sumioka  | G03B 19/12  |
| 2023/0022577 | A1* | 1/2023 | Osaka    | G03B 30/00  |
| 2023/0251457 | A1* | 8/2023 | Endo     | H02N 2/06   |
|              |     |        |          | 359/824     |

FOREIGN PATENT DOCUMENTS

| JP | 2007-053831 A | 3/2007 |
| JP | 2008-220097 A | 9/2008 |
| JP | 2010-284056 A | 12/2010 |
| JP | 2013-076944 A | 4/2013 |
| JP | 2016-116352 A | 6/2016 |
| JP | 2017-017436 A | 1/2017 |

OTHER PUBLICATIONS

"Notice of Reasons for Refusal" Office Action issued in JP 2022-018069; mailed by the Japanese Patent Office on Aug. 5, 2025.

* cited by examiner

*Primary Examiner* — Rhonda S Peace
(74) *Attorney, Agent, or Firm* — Studebaker Brackett PLLC

(57) ABSTRACT

A drive device includes a piezoelectric element, a drive shaft that receives vibration of the piezoelectric element and vibrates along an optical axis direction of a first imaging optical system, an engagement member that is frictionally engaged with the drive shaft and is connected to the first imaging optical system, and a lens controller that controls vibration of the piezoelectric element, in which the first imaging optical system is provided to be movable in a range including at least a first position and a second position, and the lens controller performs control of moving the first imaging optical system from the first position to the second position in a case in which a signal for instructing a power of the drive device to be turned off is received.

10 Claims, 18 Drawing Sheets

DRIVE DEVICE AND IMAGING APPARATUS

CROSS-REFERENCE TO RELATED APPLICATIONS

This application claims priority under 35 U.S.C. § 119(a) to Japanese Patent Application No. 2022-018069 filed on 8 Feb. 2022. The above application is hereby expressly incorporated by reference, in its entirety, into the present application.

BACKGROUND OF THE INVENTION

1. Field of the Invention

The present invention relates to a drive device that drives an imaging optical system and an imaging apparatus.

2. Description of the Related Art

JP2016-116352A discloses a drive device comprising an oscillator, an ultrasound motor including a friction member in frictional contact with the oscillator, and a controller that controls the ultrasound motor to drive a driven member. The controller counts the number of times that the ultrasound motor has passed through an activation position and an end position based on the detected position of the driven member, and changes the activation position and the end position in accordance with the counted number of times.

JP2013-76944A discloses a drive device comprising a housing, a barrel holder that is provided to be movable in an optical axis direction of a lens and holds the lens, and a piezoelectric element. The piezoelectric element and a drive shaft that is fixed to the piezoelectric element and receives vibration of the piezoelectric element are fixed to the barrel holder such that a longitudinal direction of the drive shaft is along the optical axis direction of the lens. The housing is provided with a shaft holding part that holds the drive shaft in a slidable state.

SUMMARY OF THE INVENTION

An embodiment according to the technology of the present disclosure provides a drive device and an imaging apparatus capable of suppressing, to the minimum, a damage of a drive shaft that occurs in a case in which a power is turned off and ensuring good operability.

One aspect of the technology of the present disclosure relates to a drive device that drives an imaging optical system, the device comprising a piezoelectric element, a drive shaft that receives vibration of the piezoelectric element and vibrates along an optical axis direction of the imaging optical system, an engagement member that is frictionally engaged with the drive shaft and is connected to the imaging optical system, and a processor that controls vibration of the piezoelectric element, in which the imaging optical system is provided to receive vibration of the piezoelectric element and to be movable in a range including at least a first position and a second position, and the processor performs control of moving the imaging optical system from the first position to the second position in a case in which a signal for instructing a power of the drive device to be turned off is received.

It is preferable that the processor perform control of moving the imaging optical system from the first position to the second position based on a time during which the piezoelectric element is in a stop state.

It is preferable that the first position be a position within a movement range in which the imaging optical system is moved in a case in which a signal for instructing the power of the drive device to be turned on is received, and the second position be a position other than the movement range in a range in which the imaging optical system is engaged with the drive shaft via the engagement member.

It is preferable that the first position be a position within a movement range for imaging that guarantees optical accuracy of the imaging optical system, and the second position be a position other than the movement range for imaging in a range in which the imaging optical system is engaged with the drive shaft via the engagement member.

It is preferable that the second position be located on outer sides of both ends of the movement range for imaging, and the processor perform control of moving the imaging optical system to the second position that is closer to the first position at which the imaging optical system is located among the second positions located on the outer sides of both ends in a case in which the signal for instructing the power to be turned off is received.

It is preferable that, in a case in which a maximum movement amount of movement of the imaging optical system within the movement range for imaging in the optical axis direction is denoted by A, an engagement length of engagement between the engagement member and the drive shaft is denoted by W, and a length of the drive shaft is denoted by L, a relationship of $L > A + 2W$ be satisfied.

It is preferable that, in a case in which a maximum movement amount of movement of the imaging optical system within the movement range for imaging in the optical axis direction is denoted by A, an engagement length of engagement between the engagement member and the drive shaft is denoted by W, and a length of the drive shaft is denoted by L, a relationship of $L > A + 3W$ be satisfied.

It is preferable that a lubricant reservoir portion for retaining a lubricant be provided on a track of the drive shaft, and the second position be located closer to the movement range for imaging than the lubricant reservoir portion in the optical axis direction.

It is preferable that a lubricant reservoir portion for retaining a lubricant be provided on a track of the drive shaft, and the second position be located on a side opposite to the lubricant reservoir portion in the optical axis direction with the movement range for imaging interposed therebetween.

It is preferable that, in a case in which a diameter of the drive shaft in a portion that is frictionally engaged with the engagement member in a case in which the imaging optical system is located at the first position is denoted by a first diameter, and a diameter of the drive shaft in a portion that is frictionally engaged with the engagement member in a case in which the imaging optical system is located at the second position is denoted by a second diameter, the first diameter be smaller than the second diameter.

It is preferable that, in a case in which a frictional force between the drive shaft and the engagement member in a portion that is frictionally engaged with the engagement member in a case in which the imaging optical system is located at the first position is denoted by a first frictional force, and a frictional force between the drive shaft and the engagement member in a portion that is frictionally engaged with the engagement member in a case in which the imaging optical system is located at the second position is denoted by a second frictional force, the first frictional force be smaller than the second frictional force. It is preferable that the drive shaft be a carbon shaft.

Another aspect of the technology of the present disclosure relates to an imaging apparatus comprising the drive device described above, and the imaging optical system.

BRIEF DESCRIPTION OF THE DRAWINGS

FIGS. 11A and 11B are explanatory diagrams of an operation of moving the imaging optical system in an optical axis direction by vibration of the piezoelectric element, in which FIG. 11A is an explanatory diagram showing a voltage non-applied state and FIG. 11B is an explanatory diagram showing a state in which a voltage is applied such that an electrode layer of the piezoelectric element on an upper side has a negative potential and an electrode layer on a lower side has a positive potential.

FIGS. 12A and 12B are explanatory diagrams of the operation of moving the imaging optical system in the optical axis direction by vibration of the piezoelectric element, in which FIG. 12A is an explanatory diagram showing a state in which the voltage is applied such that the electrode layer of the piezoelectric element on the upper side has the positive potential and the electrode layer on the lower side has the negative potential and FIG. 12B is an explanatory diagram showing the state in which the voltage is applied such that the electrode layer of the piezoelectric element on the upper side has the negative potential and the electrode layer on the lower side has the positive potential.

DESCRIPTION OF THE PREFERRED EMBODIMENTS

First Embodiment

Figure 1:
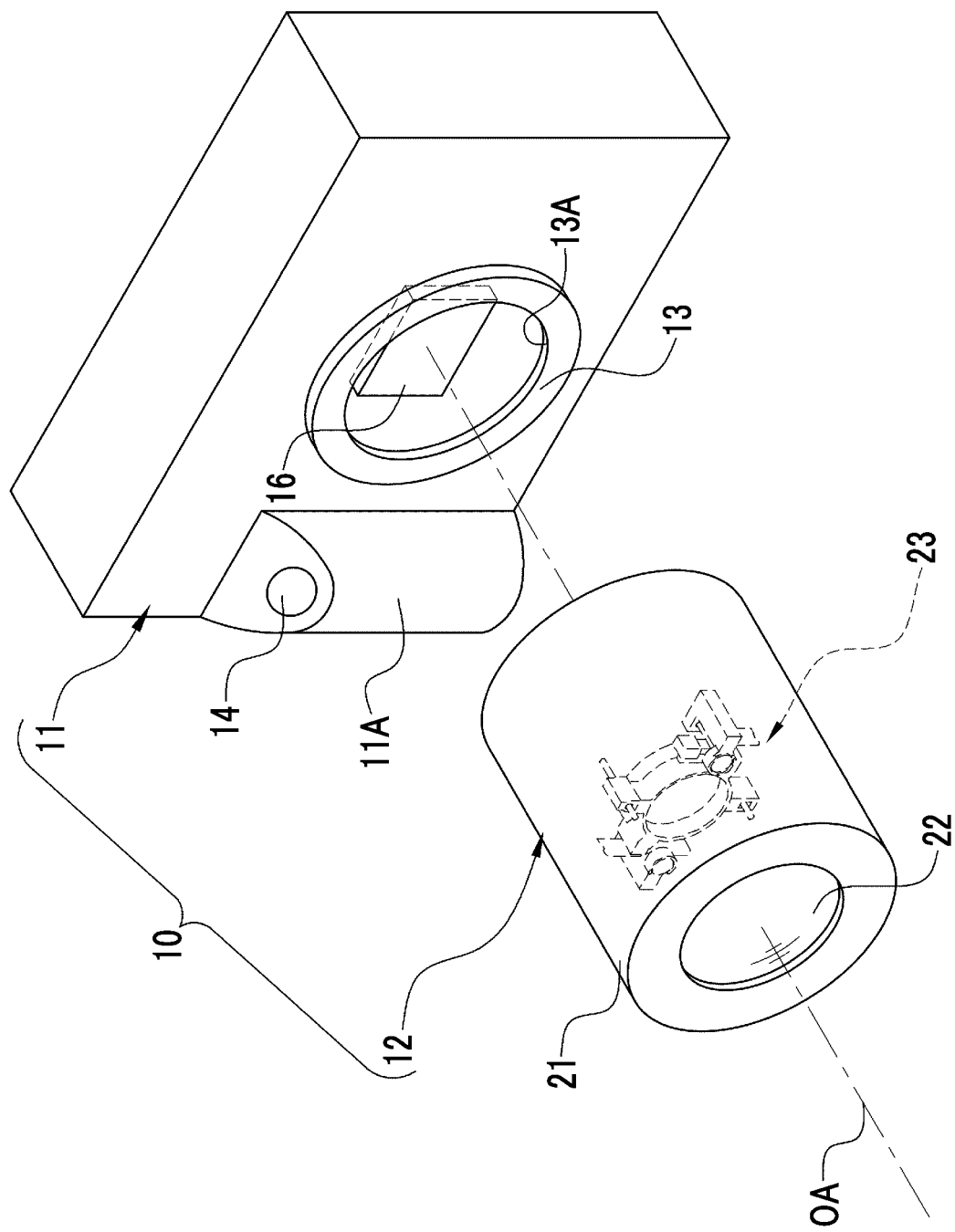
FIG. 1 is an exploded perspective view of a digital camera.

As shown in FIG. 1, a digital camera 10 comprises a camera body 11 and an interchangeable lens barrel 12. A lens mount 13, a release switch 14, a power switch (not shown), and the like are provided on a front surface of the camera body 11. The lens mount 13 has a circular-shaped imaging aperture 13A. The lens barrel 12 is attachably and detachably mounted on the lens mount 13. The digital camera 10 is an example of an imaging apparatus according to the present invention.

An imaging element 16 is built in the camera body 11. The imaging element 16 is a complementary metal oxide semiconductor (CMOS) image sensor, a charge coupled device (CCD) image sensor, or an organic thin-film imaging element. The lens mount 13 is provided with a body-side signal contact 17 (see FIG. 14) inside the imaging aperture 13A for electrically connecting the lens mount 13 to the lens barrel 12 to perform the communication. Moreover, the camera body 11 has a grip portion 11A.

The lens barrel 12 comprises a lens barrel body 21, an imaging optical system 22, and a drive device 23 described below. The lens barrel body 21 has a cylindrical shape and holds the imaging optical system 22 and the drive device 23 therein, and is provided with a lens mount 24 (see FIG. 3) and a lens-side signal contact 25 (see FIG. 10) at a rear end thereof. The imaging optical system 22 images subject light on the imaging element 16 in a case in which the lens barrel 12 is mounted on the camera body 11.

Figure 2:
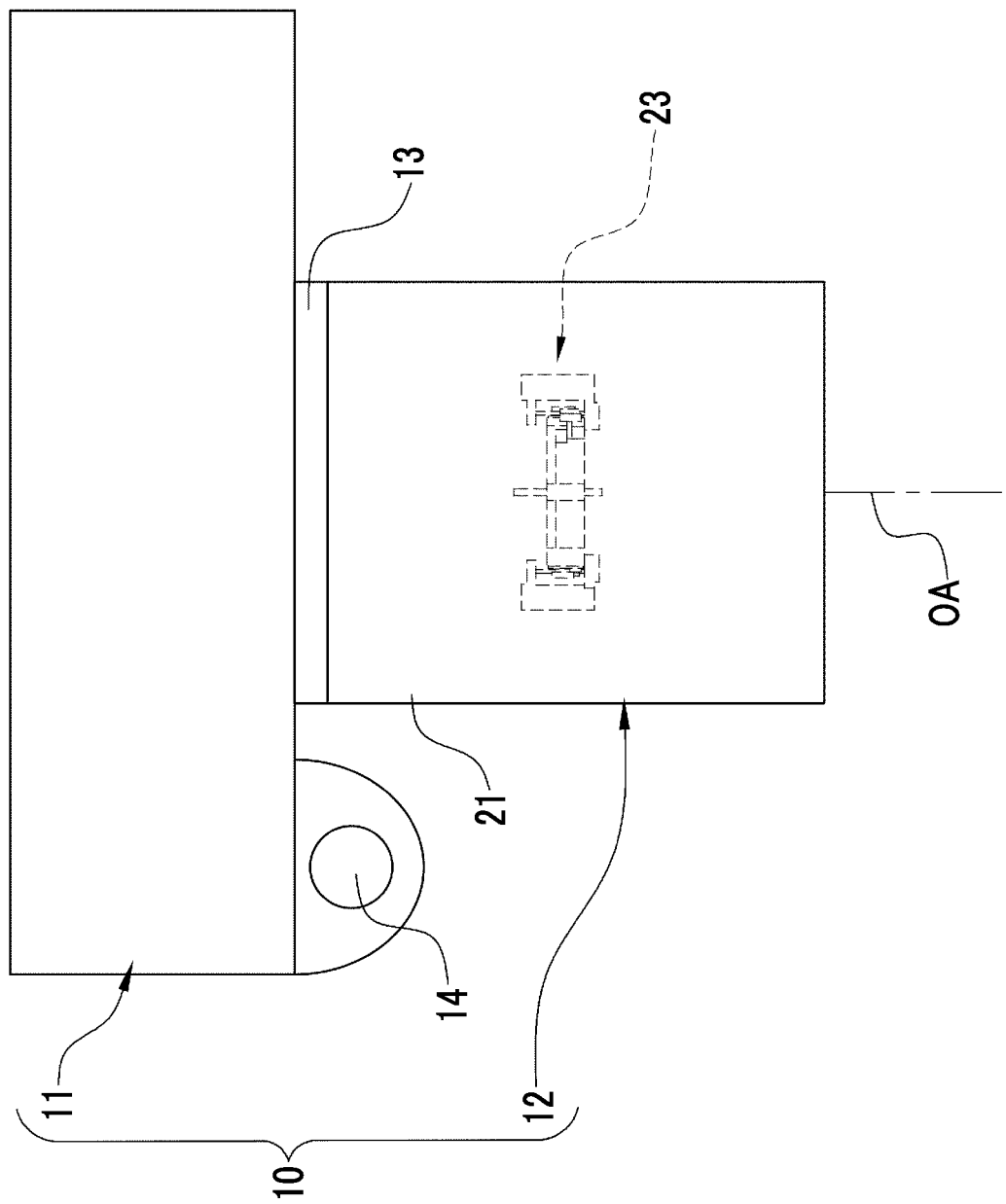
FIG. 2 is a plan view of the digital camera.
Figure 3:
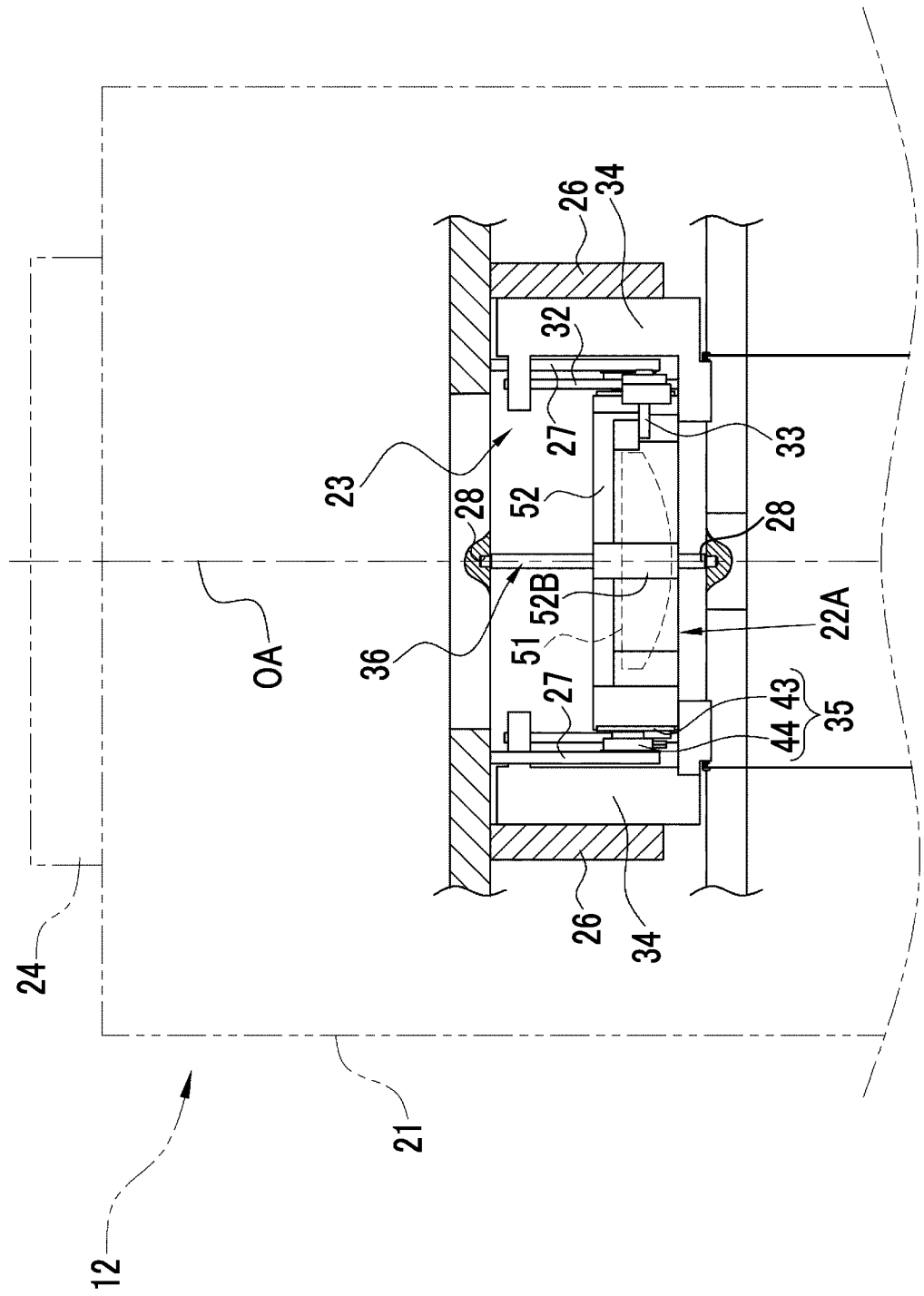
FIG. 3 is a cross-sectional view of a main part of a lens barrel.

As shown in FIGS. 2 and 3, the drive device 23 is disposed inside the lens barrel 12. The drive device 23 drives a first imaging optical system 22A which is a part of the imaging optical system 22. The first imaging optical system 22A corresponds to an "imaging optical system" within the scope of the claims. The drive device 23 is attached to the lens barrel body 21 via attachment members 26 and 27, and the like.

The first imaging optical system 22A comprises a focus lens 51 and a lens holding frame 52. The lens holding frame 52 is formed in a cylindrical shape and holds the focus lens 51. The lens holding frame 52 is connected to a holding member 34 described below.

Figure 4:
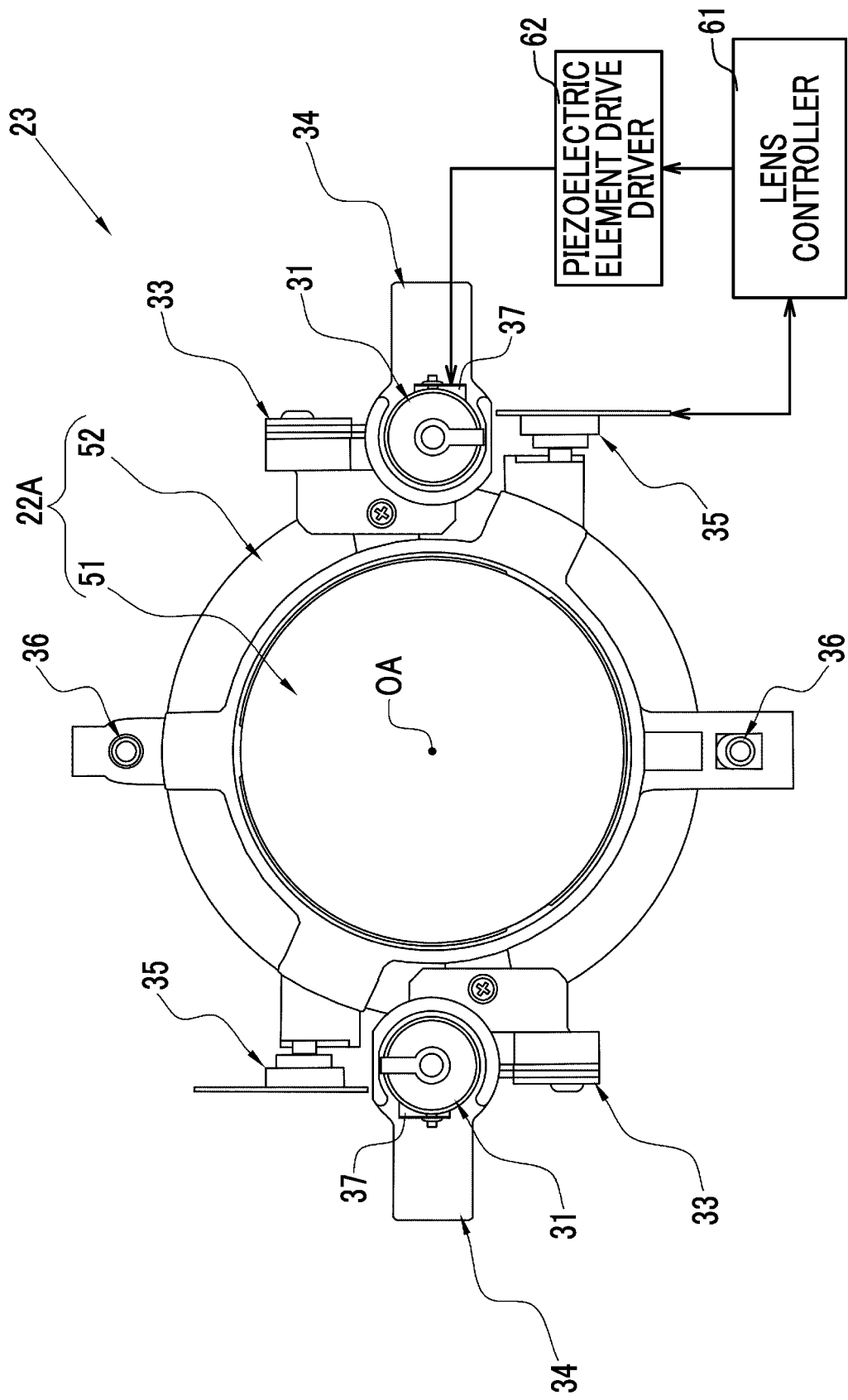
FIG. 4 is a front view of a drive device.

As shown in FIG. 4, the drive device 23 comprises a piezoelectric element 31, a drive shaft 32 (see FIGS. 5 to 8, and 10), an engagement member 33, a holding member 34, a position detection sensor 35, a guide shaft 36, a lens controller 61, and a piezoelectric element drive driver 62. The lens controller 61 controls the vibration of the piezoelectric element 31 via the piezoelectric element drive driver 62. Moreover, as will be described below, the lens controller 61 controls each unit of the lens barrel 12.

Figure 5:
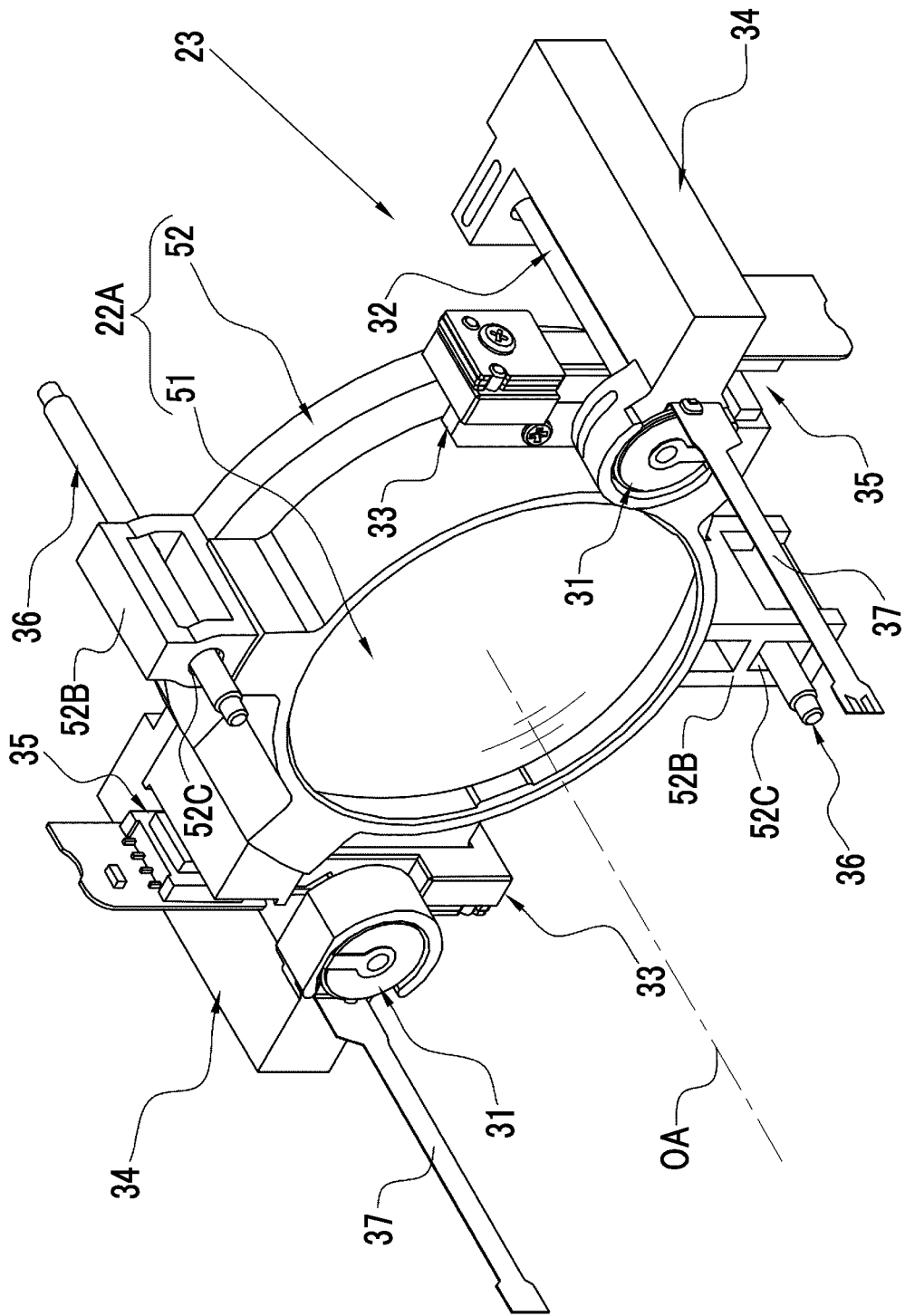
FIG. 5 is a perspective view of the drive device.

As shown in FIG. 5, the piezoelectric element 31 is a bimorph type piezoelectric element including electrode layers on both surfaces of a piezoelectric body having an outer shape formed in a disk shape. Flexible substrates 37 are connected to both surfaces of the piezoelectric element 31. The flexible substrate 37 is connected to the piezoelectric element drive driver 62. In the piezoelectric element 31, a piezoelectric body constituting the piezoelectric element 31 to which a voltage is applied by the piezoelectric element drive driver 62 via the flexible substrate 37 is, for example, a piezoelectric material, such as piezoelectric ceramics.

The piezoelectric element 31 has a planar shape without being curved in a voltage non-applied state. In a case in which a predetermined drive voltage is applied between the electrode layers to the piezoelectric element 31 by the piezoelectric element drive driver 62 such that one electrode layer has a negative potential and the other electrode layer has a positive potential, one electrode layer side of the piezoelectric body expands, and the other electrode layer side contracts, so that the piezoelectric element 31 is curved in a bowl shape (that is, a curved state in which one electrode layer side is convex). On the contrary, in a case in which the predetermined drive voltage is applied between the electrode layers to the piezoelectric element 31 such that one electrode layer has the positive potential and the other electrode layer has the negative potential, one electrode layer side of the piezoelectric body contracts, and the other electrode layer side expands, so that the piezoelectric element 31 is curved in a bowl shape (that is, a curved state in which the other electrode layer side is convex). Then, in a case in which the first imaging optical system 22A is driven, the lens controller 61 periodically changes a direction in which the piezoelectric element 31 is convex by applying the voltage to vibrate the piezoelectric element 31. It should be noted that an operation of moving the first imaging optical system 22A by the vibration of the piezoelectric element 31 will be described below.

Figure 6:
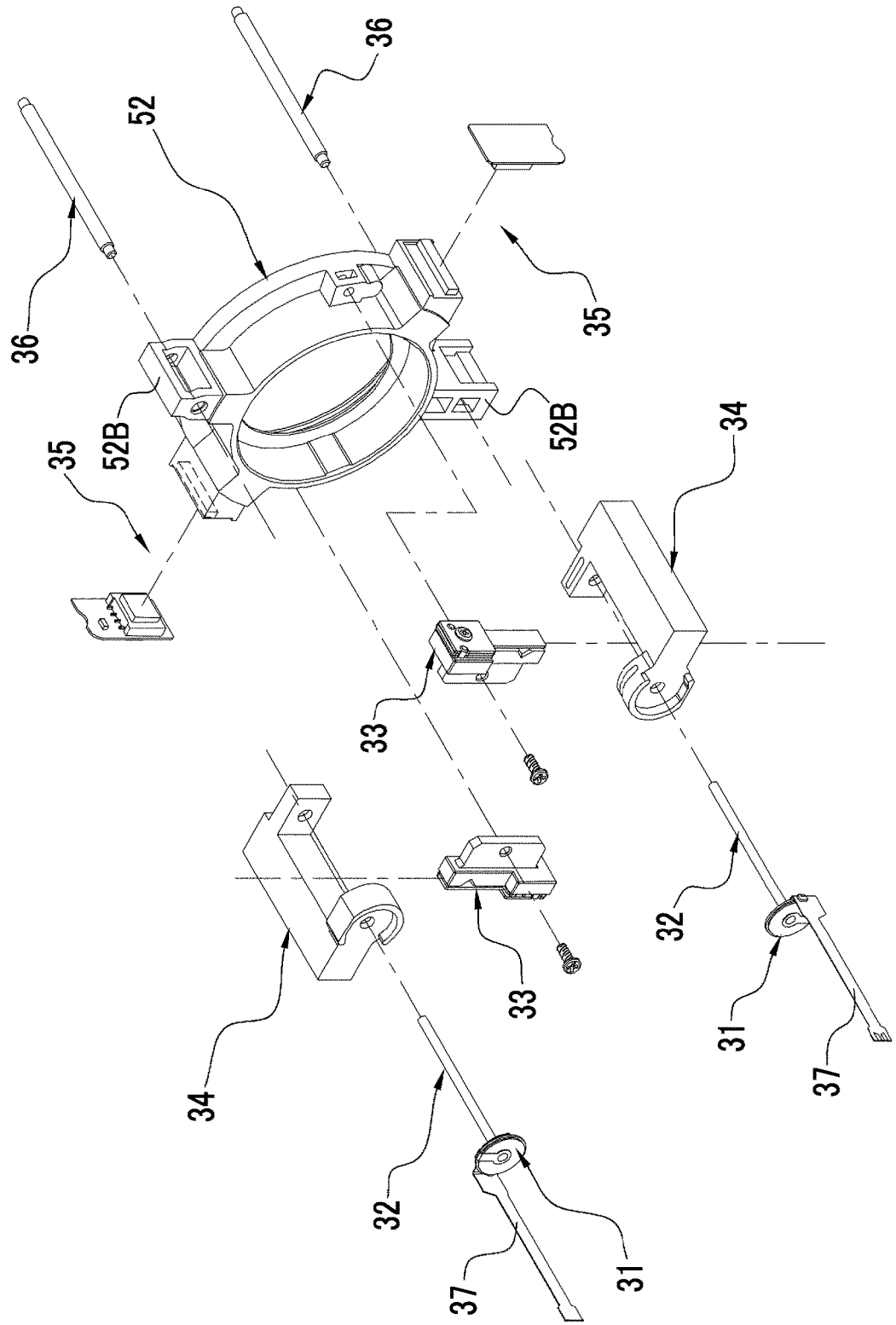
FIG. 6 is an exploded perspective view of the drive device.

As shown in FIG. 6, the drive shaft 32 is formed in a columnar shape, and one end thereof is bonded to the piezoelectric element 31. The drive shaft 32 is a carbon shaft, for example. An outer diameter of the drive shaft 32 is smaller than an outer diameter of the piezoelectric element 31. A central axis of the drive shaft 32 and a central axis of the piezoelectric element 31 coincide with each other. In the bonding between the drive shaft 32 and the piezoelectric element 31, for example, one end of the drive shaft 32 is fitted into a through-hole formed in the center of the piezoelectric element 31. Alternatively, the drive shaft 32 and the piezoelectric element 31 may be bonded to each other by an adhesive, soldering, or the like.

The drive shaft 32 is disposed in parallel with an optical axis OA of the imaging optical system 22. Since the drive shaft 32 is bonded to the piezoelectric element 31 as described above, the drive shaft 32 receives the vibration of the piezoelectric element 31 and vibrates along an optical axis OA direction.

Figure 7:
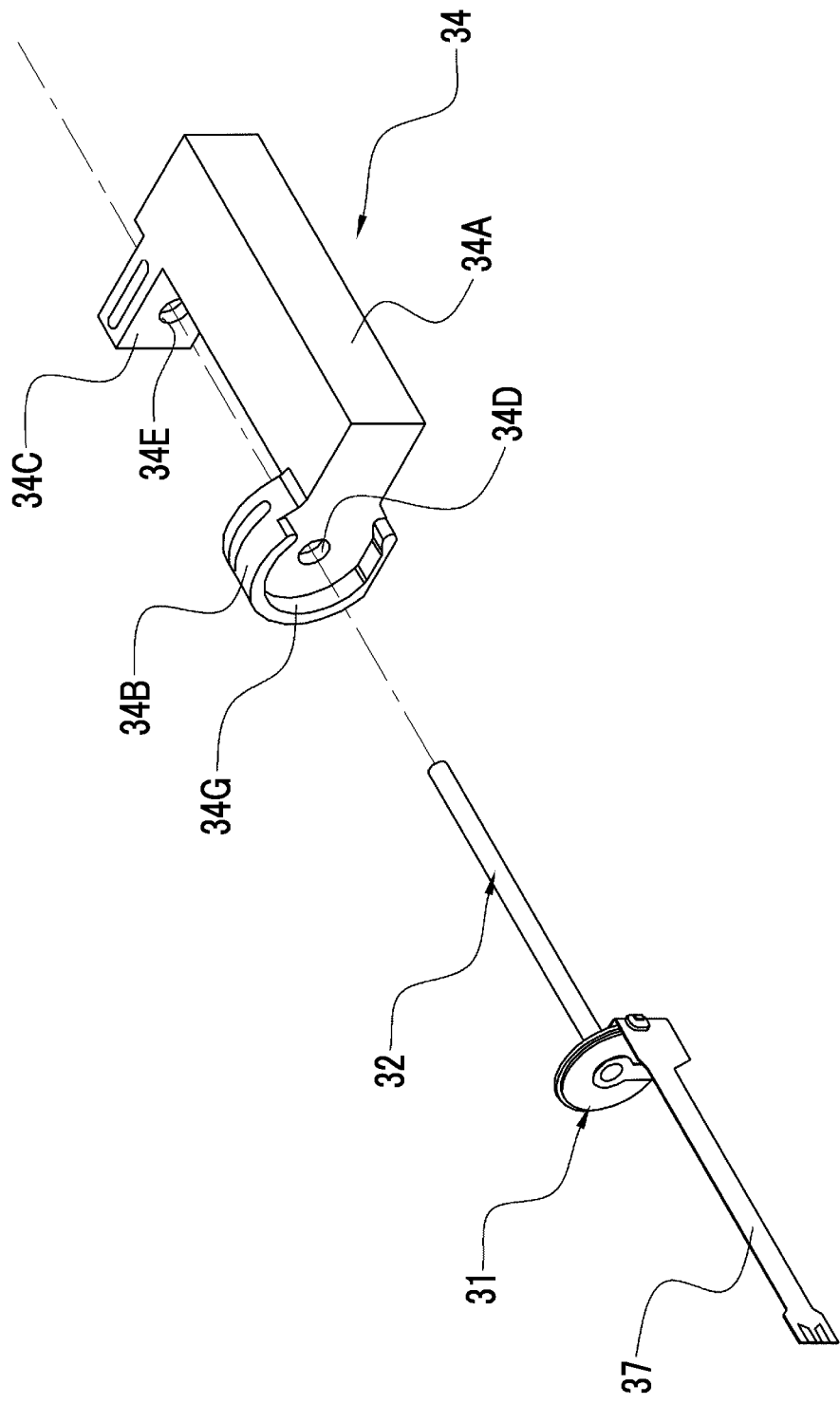
FIG. 7 is a perspective view of a piezoelectric element, a drive shaft, and a holding member.

As shown in FIG. 7, the piezoelectric element 31 and the drive shaft 32 are held by the holding member 34. The holding member 34 is formed in a U-shaped bent shape. Specifically, in the holding member 34, a pillar portion 34A, and holding pieces 34B and 34C are integrally formed. The pillar portion 34A is formed in a pillar shape having a rectangular cross section disposed in parallel with the optical axis OA.

The holding pieces 34B and 34C are disposed at a distal end portion and a base end portion of the pillar portion 34A. Through-holes 34D and 34E are formed in the holding pieces 34B and 34C. In the drive shaft 32, the distal end portion and the base end portion pass through the through-holes 34D and 34E and are held by the holding pieces 34B and 34C. It should be noted that a bearing member 34F (see FIGS. 11A to 12B) is provided inside the holding pieces 34B and 34C and around the drive shaft 32. The bearing member 34F is formed of an elastic body, such as rubber, and prevents the drive shaft 32 from being detached from the holding pieces 34B and 34C due to a frictional force generated between the bearing member 34F and the drive shaft 32.

A cylindrical-shaped rib 34G is integrally formed with the holding piece 34B. An inner diameter of the rib 34G is formed in accordance with the outer diameter of the piezoelectric element 31. As a result, in a case in which the drive shaft 32 is held by the holding pieces 34B and 34C, the rib 34G holds the piezoelectric element 31.

The holding member 34 is fixed to the attachment member 26, for example, by screwing (see FIG. 3). As a result, the piezoelectric element 31 and the drive shaft 32 are attached to the lens barrel body 21 via the holding member 34 and the attachment member 26.

Figure 8:
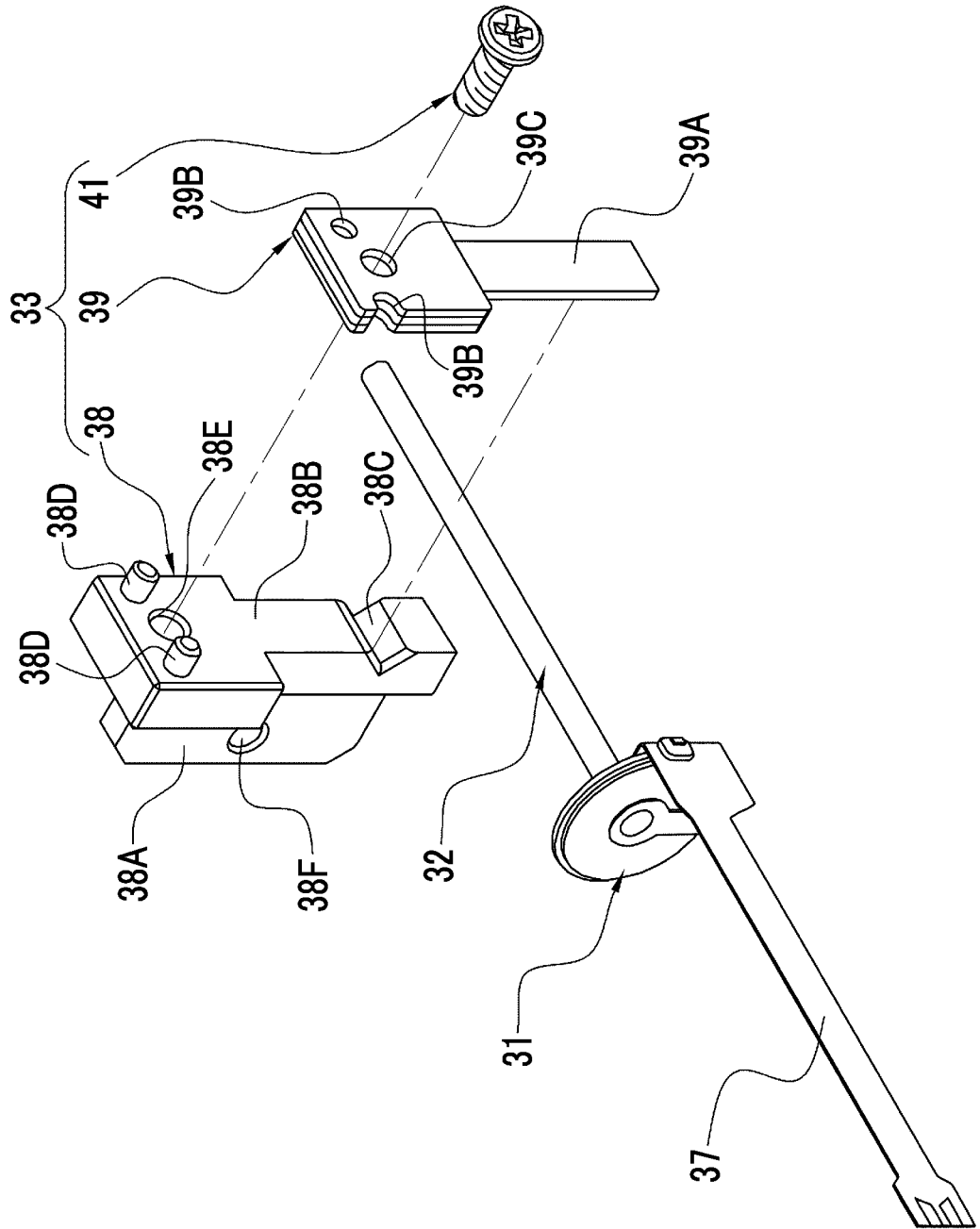
FIG. 8 is an exploded perspective view of the piezoelectric element, the drive shaft, and an engagement member.

As shown in FIG. 8, the engagement member 33 includes a first member 38, a second member 39, and a screw member 41. In the first member 38, a connecting portion 38A and a reception portion 38B are integrally formed. A groove 38C, a positioning protrusion 38D, and a screw hole 38E are formed in the reception portion 38B. The groove 38C is a V-shaped groove disposed in parallel with the optical axis OA. In a case in which the drive shaft 32 is engaged with the engagement member 33, the drive shaft 32 comes into contact with the groove 38C. Since the groove 38C is formed in a V shape, an inclination of the first imaging optical system 22A with respect to the drive shaft 32 is suppressed. A screw hole 38F is formed in the connecting portion 38A.

In the second member 39, a pressing piece 39A, a positioning opening 39B, and a screw hole 39C are formed. The positioning of the second member 39 in the optical axis OA direction is performed by fitting the positioning opening 39B into the positioning protrusion 38D of the first member 38. The pressing piece 39A is a flat spring having elasticity.

In a state in which the drive shaft 32 is disposed between the groove 38C and the pressing piece 39A, the screw member 41 is screwed with the screw hole 39C of the second member 39 and the screw hole 38E of the first member 38 to connect the first member 38 and the second member 39, and the drive shaft 32 is interposed between the groove 38C and the pressing piece 39A. Since the drive shaft 32 receives a biasing force from the pressing piece 39A, the drive shaft 32 is frictionally engaged with the engagement member 33.

The piezoelectric element 31, the drive shaft 32, the engagement member 33, and the holding member 34 are respectively disposed at positions that are rotationally symmetric about the optical axis OA of the imaging optical system 22 (that is, the optical axis of the first imaging optical system 22A) by 180 degrees (see FIG. 4). That is, a pair of piezoelectric elements 31, the drive shaft 32, the engagement member 33, and the holding member 34 are provided for the first imaging optical system 22A.

Figure 9:
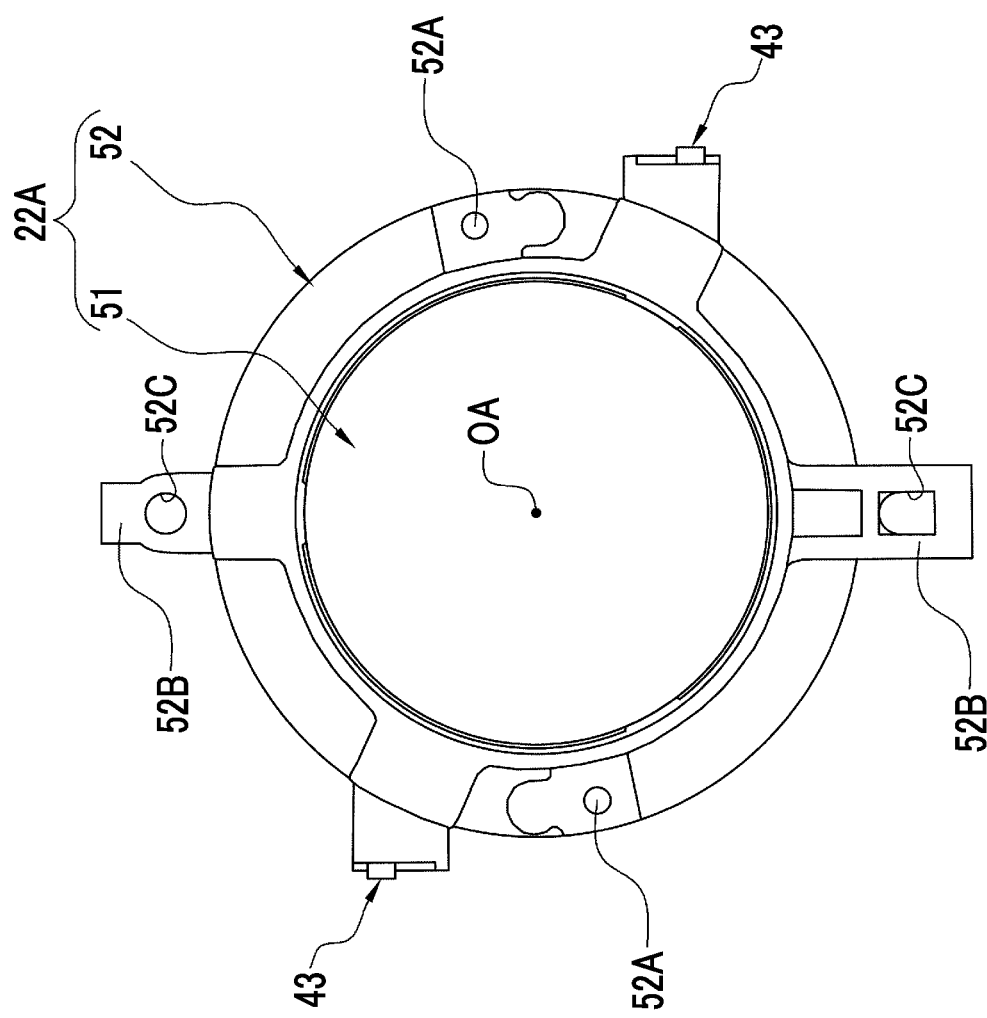
FIG. 9 is a front view of a lens holding frame.
Figure 10:
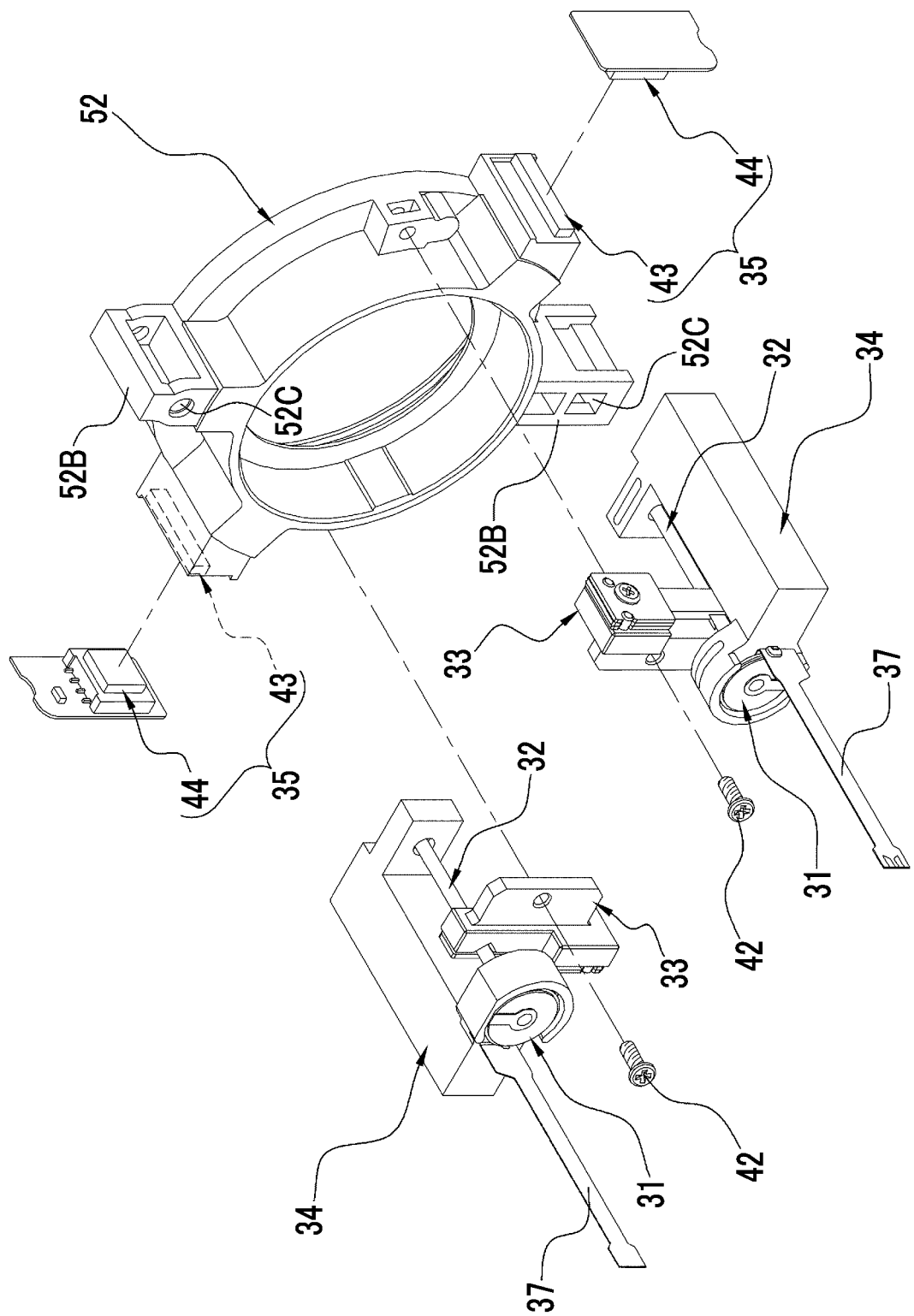
FIG. 10 is a perspective view showing a state in which the lens holding frame and the engagement member are connected to each other.

As shown in FIG. 9, in the lens holding frame 52, screw holes 52A are respectively provided at positions that are rotationally symmetric about the optical axis OA by 180 degrees. As shown in FIG. 10, the lens holding frame 52 and the engagement member 33 are connected by screwing the screw member 42 with the screw holes 52A and the screw hole 38F. As described above, the engagement member 33 is frictionally engaged with the drive shaft 32 and is connected to the first imaging optical system 22A. Further, the holding member 34 holds the drive shaft 32 and is attached to the lens barrel body 21. That is, the first imaging optical system 22A is attached to the lens barrel body 21 while holding a state being frictionally engaged with the drive shaft 32 via the engagement member 33.

The position detection sensors 35 are respectively disposed at positions that are rotationally symmetric about the optical axis OA by 180 degrees (see FIG. 4). That is, a pair of position detection sensors 35 are provided for the first imaging optical system 22A. The position detection sensor 35 detects a position of the lens holding frame 52. Specifically, a magnet 43 and a magnetic sensor 44 are provided. For example, a multi-pole magnetizing magnet is used as the magnet 43, and a magnetoresistive sensor (MR sensor) is used as the magnetic sensor 44. The magnet 43 is attached to the lens holding frame 52 (see FIG. 9). The magnetic sensor 44 is attached to the lens barrel body 21 via the attachment member 27 to face the magnet 43 (see FIG. 3).

The magnet 43 is magnetized in a pattern in which N poles and S poles are alternately arranged along the optical axis OA direction. A pattern width of the magnetization is, for example, about 100 μm. The magnetic sensor 44 is configured by using, for example, various magnetic resistance (MR) elements of which an electric resistance value is changed in accordance with strength of a magnetic field.

The magnetic sensor 44 outputs a pulse signal corresponding to the pattern of the magnet 43 in which the N poles and the S poles are alternately arranged or an electric signal that is changed periodically to the lens controller 61. Based on this output, the lens controller 61 can detect the position of the lens holding frame 52, that is, the first imaging optical system 22A. It should be noted that the position detection sensor 35 is not limited to this, and may include, for example, a hall sensor formed of a hall element and a magnet.

Moreover, in the lens holding frame 52, bosses 52B protruding from an outer peripheral surface are respectively provided at positions that are rotationally symmetric about the optical axis OA by 180 degrees. The boss 52B is formed with a guide hole 52C (see FIGS. 5 and 9) into which the guide shaft 36 is movably fitted. A distal end portion and a base end portion of the guide shaft 36 are fixed to an attachment opening portion 28 (see FIG. 3) provided in the lens barrel body 21. The guide shaft 36 is disposed in parallel with the optical axis OA direction. As a result, the guide shaft 36 guides the lens holding frame 52, that is, the first imaging optical system 22A in the optical axis OA direction.

Figure 11A:
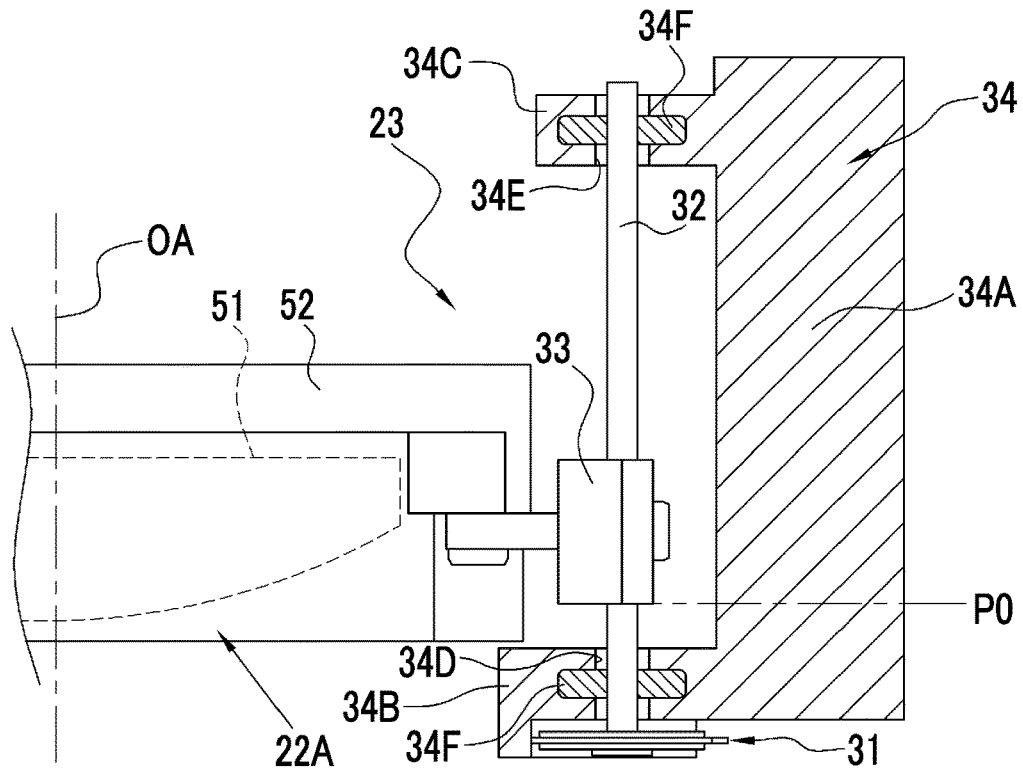

The operation of moving the first imaging optical system 22A in the optical axis OA direction by the vibration of the piezoelectric element 31 will be described with reference to FIGS. 11A to 12B. It should be noted that, in FIGS. 11A to 12B, in order to prevent the drawing from being complicated, the position detection sensor 35, the guide shaft 36, and the like are omitted. As shown in FIG. 11A, in a state in which the first imaging optical system is stopped before the first imaging optical system 22A is moved, the piezoelectric element 31 is in the voltage non-applied state, and has a planar shape.

Figure 11B:
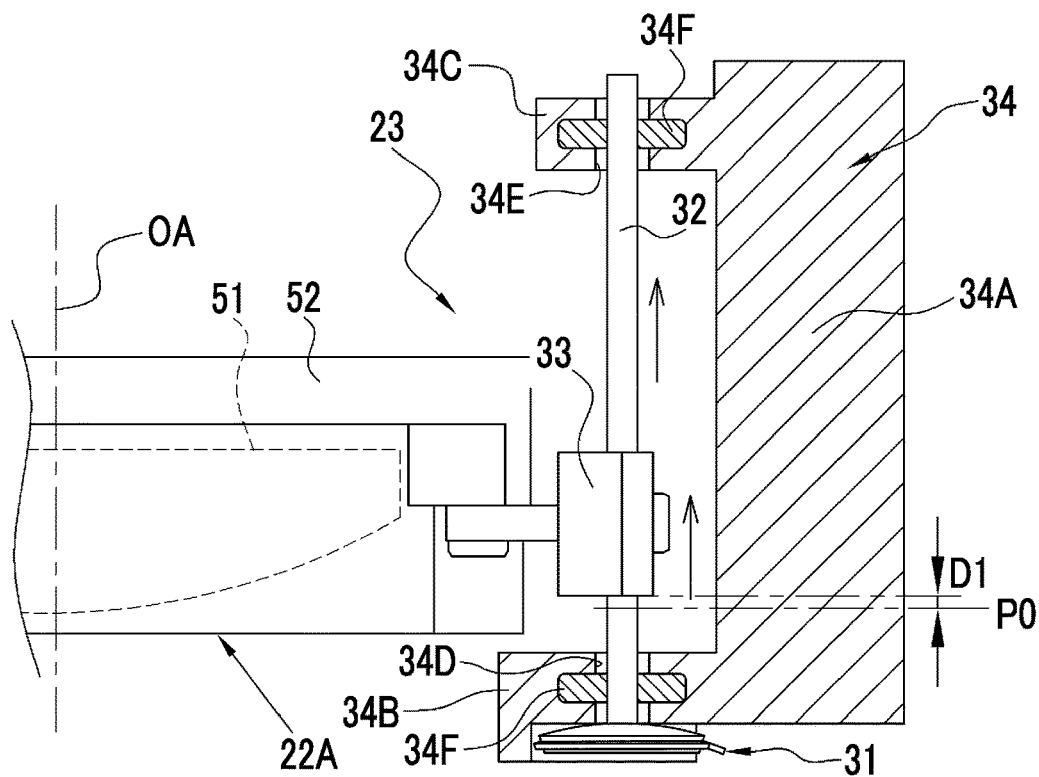

First, as shown in FIG. 11B, in a case in which the lens controller 61 controls the piezoelectric element drive driver 62 to apply the voltage having the negative potential for the electrode layer on the upper side in the drawing and the positive potential for the electrode layer on the lower side, the piezoelectric element 31 is displaced in a curved state that is convex to the upper side in the drawing. In this case, since the drive shaft 32 and the engagement member 33 are frictionally engaged with each other, the drive shaft 32, the engagement member 33, and the first imaging optical system 22A are moved to the base end side of the optical axis OA by the same movement amount as a displacement amount D1 (displacement amount from an initial position P0 shown in FIG. 11A) in which the piezoelectric element 31 is displaced in the optical axis OA direction.

Figure 12A:
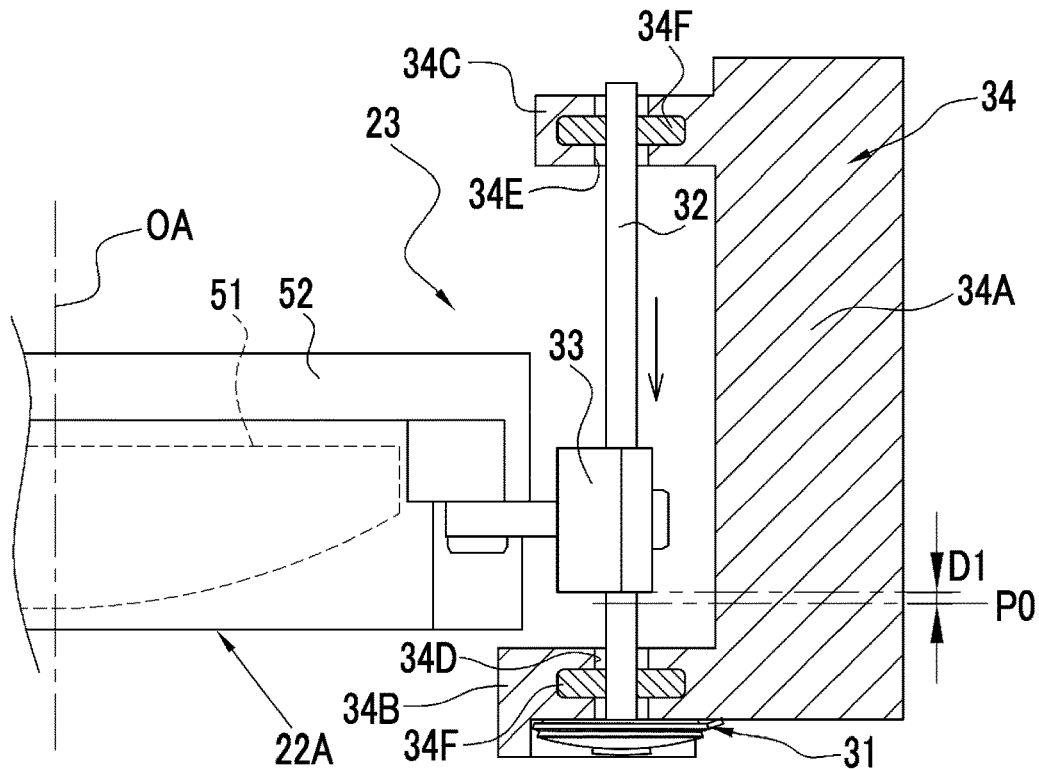

Next, as shown in FIG. 12A, contrary to the state shown in FIG. 11B, in a case in which the lens controller 61 applies the voltage having the positive potential for the electrode layer on the upper side in the drawing and the negative potential for the electrode layer on the lower side, the piezoelectric element 31 is displaced in a curved state that is convex to the lower side in the drawing. In the case shown in FIG. 12A, the lens controller 61 applies the voltage in a shorter time than in the case shown in FIG. 11B, and moves the piezoelectric element 31 quickly. As a result, only the drive shaft 32 returns to the initial position P0 shown in FIG. 11A due to an inertial force, and the engagement member 33 and the first imaging optical system 22A remain at the positions moved by the displacement amount D1.

Figure 12B:
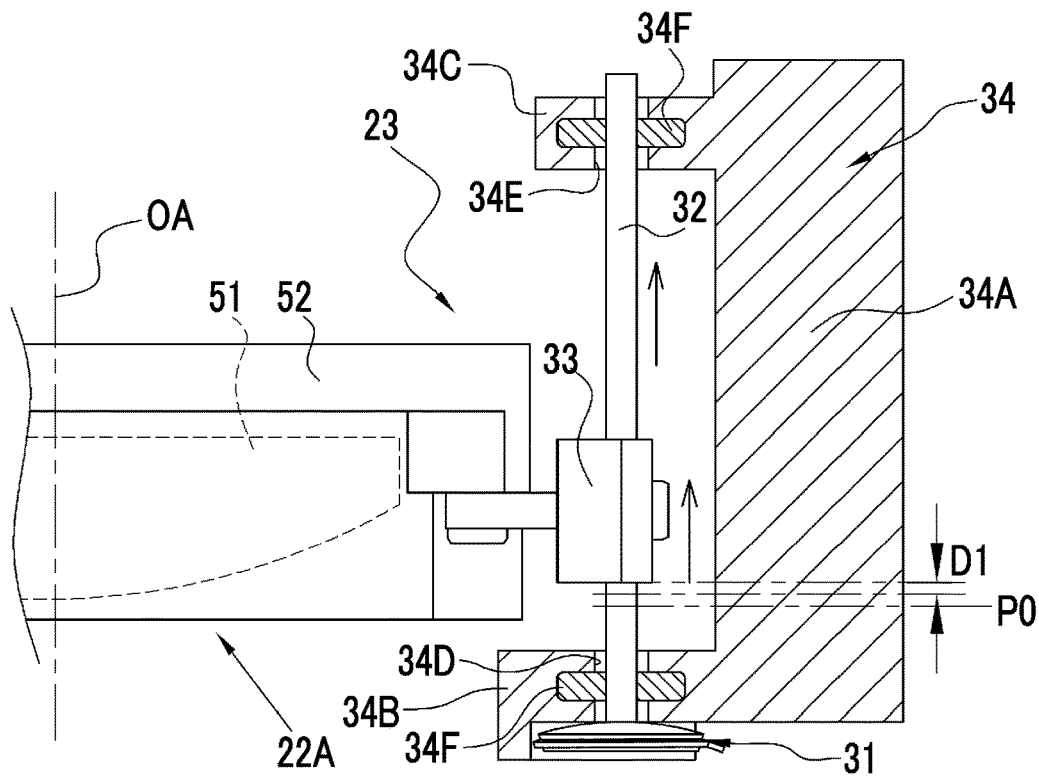

Further, as shown in FIG. 12B, in a case in which the lens controller 61 applies the voltage in which the positive and negative potentials are reversed (that is, the same state as the case shown in FIG. 11B) to the piezoelectric element 31, the piezoelectric element 31 is displaced in the curved state that is convex to the upper side in the drawing. In this case, as in the case of FIG. 11B, the drive shaft 32, the engagement member 33, and the first imaging optical system 22A are moved to the base end side of the optical axis OA by the same movement amount as the displacement amount D1 in which the piezoelectric element 31 is displaced in the optical axis OA direction. That is, the drive shaft 32, the engagement member 33, and the first imaging optical system 22A are moved twice the displacement amount D1 from the initial position P0.

Then, in a case in which the lens controller 61 applies the voltage in which the positive and negative potentials are reversed (that is, the same state as shown in FIG. 12A), the piezoelectric element 31 is displaced in the curved state that is convex to the lower side in the drawing. In this case, as in the case shown in FIG. 12A, in a case in which the piezoelectric element 31 is moved quickly, only the drive shaft 32 returns to the initial position P0 shown in FIG. 11A due to an inertial force, and the engagement member 33 and the first imaging optical system 22A remain at the positions moved by the displacement amount D1×2 times from the initial position P0.

In this way, in a case in which the piezoelectric element 31 periodically changes the direction to be convex by the lens controller 61 repeating the application of the voltage, that is, the piezoelectric element 31 is vibrated, the engagement member 33 and the first imaging optical system 22A can be moved along the drive shaft 32. Moreover, in a case in which the engagement member 33 and the first imaging optical system 22A are moved to the distal end side of the optical axis OA, a process reverse to the above, that is, an operation in which the piezoelectric element 31 is moved slowly in a case in which the piezoelectric element 31 is displaced in the curved state that is convex to the lower side in the drawing and the piezoelectric element 31 is moved quickly in a case in which the piezoelectric element 31 is displaced in the curved state that is convex to the upper side in the drawing need only be repeated.

The first imaging optical system 22A is provided to receive the vibration of the piezoelectric element 31 and to be movable in a range including at least the first position and the second position. In the following, the first position and the second position at which the first imaging optical system 22A is moved will be described.

Figure 13:
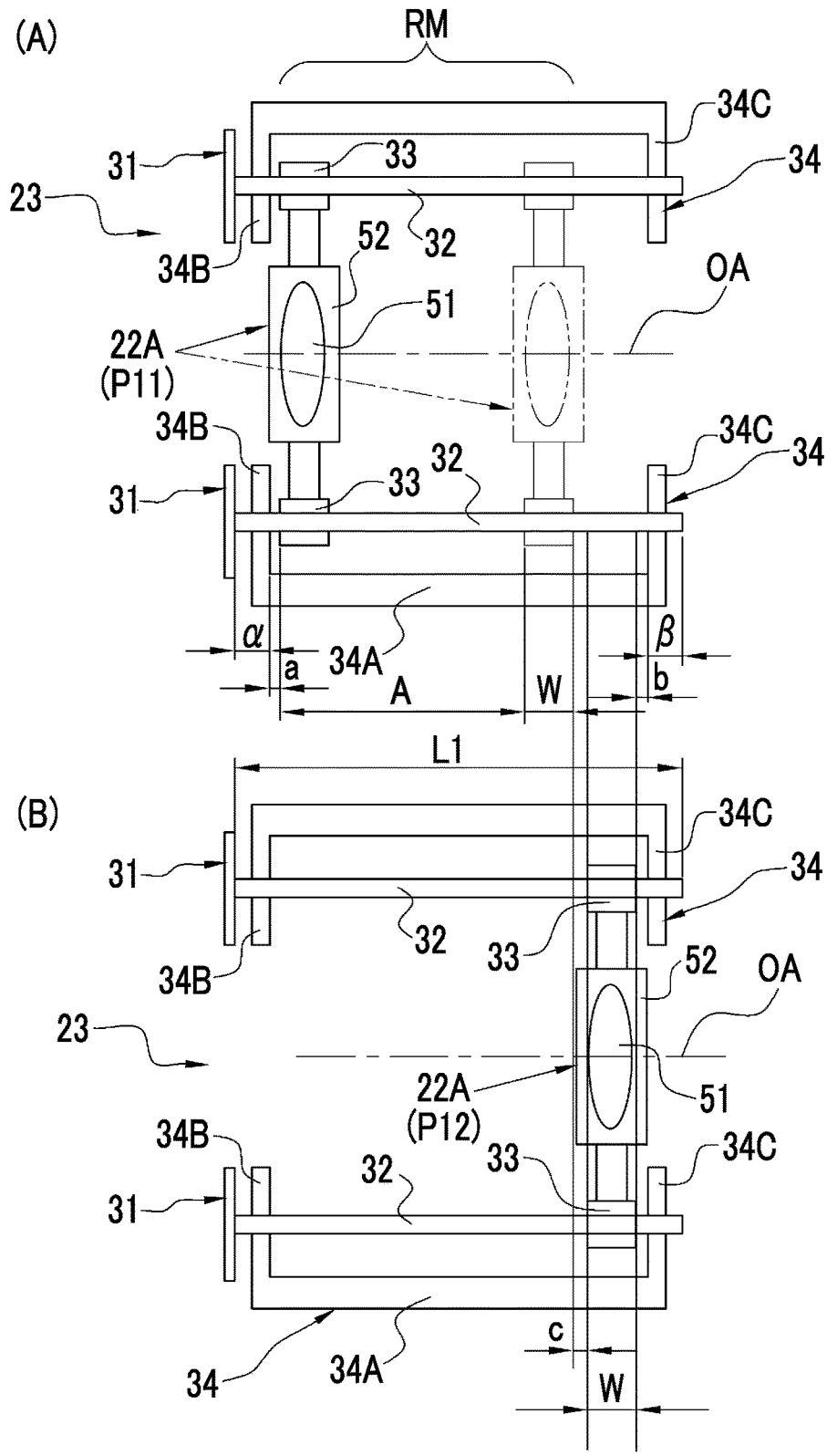
FIG. 13 is an explanatory diagram showing a relationship between a length of the drive shaft and a movement range.

As shown in a portion (A) in FIG. 13, within a movement range RM of the first imaging optical system 22A in the optical axis OA direction, a maximum movement amount of the movement of the first imaging optical system 22A is denoted by A, an engagement length of the engagement between the engagement member 33 and the drive shaft 32 is denoted by W, and a length of the drive shaft 32 is denoted by L1. It should be noted that, in the portions (A) and (B) in FIG. 13, for convenience of description, each component is shown in a simplified manner.

A first position P11 is a position within the movement range RM. It should be noted that the position within the movement range RM as used herein means a case in which all the engagement members 33 are located within the movement range RM. The movement range RM is a movement range in which the first imaging optical system 22A is moved in a case in which the lens controller 61 receives a signal for instructing the power of the drive device 23 to be turned on. Specifically, a control signal from a camera body controller 71, which will be described below, corresponds to the signal for instructing the power of the drive device 23 to be turned on, and a range in which the lens controller 61, which receives the control signal, moves the first imaging optical system 22A is the movement range RM.

Further, in the present embodiment, since the first imaging optical system 22A includes the focus lens 51, the movement range RM is a movement range for imaging in which the first imaging optical system 22A is moved in a case in which focus adjustment is performed by the control of the camera body controller 71 and an autofocus (AF) processing unit 83 described below. Therefore, in a case of moving in the movement range RM, the first imaging optical system 22A should guarantee the optical accuracy. This is because, in a case in which the first imaging optical system 22A is located in the movement range RM, in a case in which the displacement or the inclination occurs, the accuracy of the focus adjustment is reduced.

As shown in the portion (B) in FIG. 13, a second position P12 is a position other than the movement range RM in the range in which the first imaging optical system 22A is engaged with the drive shaft 32 via the engagement member 33. In the present invention, the position on the base end side of the movement range RM is the second position P12. The lens controller 61 performs control of moving the first imaging optical system 22A from the first position to the second position in a case in which a signal for instructing the power of the drive device 23 to be turned off is received. That is, a stop signal (control signal for stopping the drive device 23) from the camera body controller 71 described below corresponds to the signal for instructing the power of the drive device 23 to be turned off, and the position at which the lens controller 61, which receives the stop signal, moves the first imaging optical system 22A is the second position.

In the following, the length L1 of the drive shaft 32 will be described in detail. In a case in which a length (including a length of the holding piece 34B) of a range in the drive shaft 32 in which the first imaging optical system 22A can be never moved, that is, a portion on the distal end side with respect to a portion in which the drive shaft 32 is held by the holding piece 34B is denoted by a, a length (including a length of the holding piece 34C) of a portion on the base end side with respect to a portion in which the drive shaft 32 is held by the holding piece 34C is denoted by (3, a gap between the holding piece 34B and the engagement member 33 in a case in which the first imaging optical system 22A is nearest to the holding piece 34B on the distal end side is denoted by a, a gap between the holding piece 34C and the engagement member 33 in a case in which the first imaging optical system 22A is nearest to the holding piece 34C on the base end side (that is, in a case in which the first imaging optical system 22A is at the second position P12) is denoted by b, and a gap between the engagement member 33 and the movement range RM in a case in which the first imaging optical system 22A is at the second position P12 is denoted by c, the length L1 of the drive shaft $32=\alpha+a+W+A+c+W+b+\beta$. Among these, the lengths $\alpha$, $\beta$, the gaps a, b, c, and the like are dimensions for a margin in consideration of a dimensional error, and thus at least a relationship of $L1>A+2W$ is needed.

Figure 14:
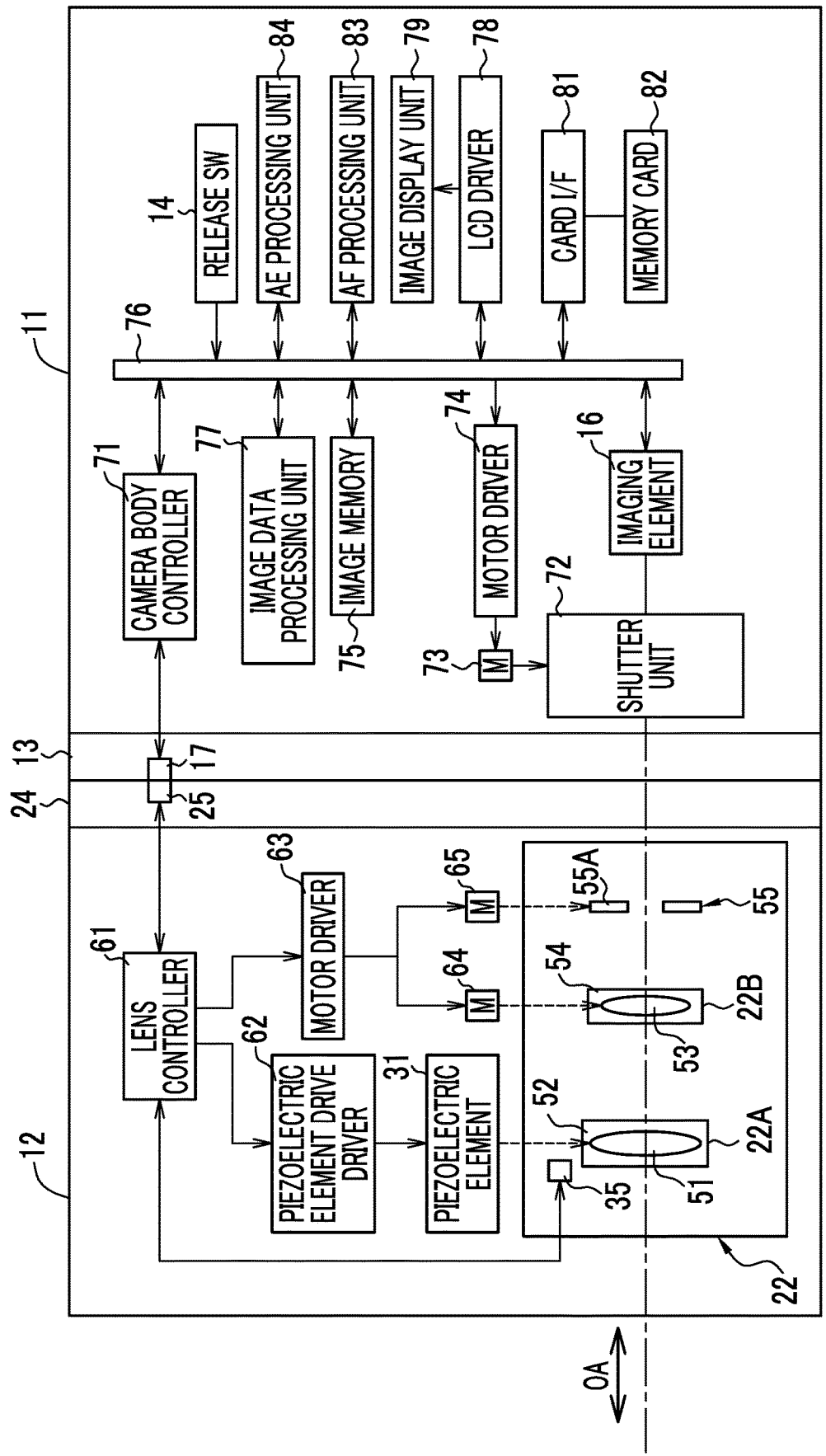
FIG. 14 is a block diagram showing a schematic configuration of the digital camera.

As shown in FIG. 14, the lens barrel 12 comprises a motor driver 63 and motors 64 and 65, in addition to the imaging optical system 22, the piezoelectric element 31, the position detection sensor 35, the lens controller 61, and the piezoelectric element drive driver 62.

The lens controller 61 consists of a microcomputer comprising a central processing unit (CPU), a read only memory (ROM) that stores programs or parameters used in the CPU, a random access memory (RAM) used as a work memory of the CPU (none of which is shown), and controls each unit of the lens barrel 12. The piezoelectric element drive driver 62, the motor driver 63, and the position detection sensor 35 are connected to each other.

The lens controller 61 controls driving of a stop unit 55, the first imaging optical system 22A, and a second imaging optical system 22B based on the control signal from the camera body controller 71 described below.

The imaging optical system 22 comprises a plurality of lenses including the first imaging optical system 22A and the second imaging optical system 22B, the stop unit 55, and the like. As described above, the first imaging optical system 22A includes the focus lens 51 and the lens holding frame 52. The first imaging optical system 22A is moved in the optical axis OA direction due to the vibration of the piezoelectric element 31 to adjust an imaging distance. The lens controller 61 transmits a control signal for moving the first imaging optical system 22A to the piezoelectric element drive driver 62 in response to the control signal on a camera body 11 side. The piezoelectric element drive driver 62 applies the voltage based on the control signal to vibrate the piezoelectric element 31.

The second imaging optical system 22B includes a zoom lens 53 and a lens holding frame 54 that holds the zoom lens 53. The second imaging optical system 22B is moved in the optical axis OA direction due to the driving of the motor 64 and constitutes an electric zoom mechanism that magnifies an angle of view of the imaging optical system 22. In the zoom mechanism, for example, a movement amount and a movement direction of the second imaging optical system 22B are decided in response to the operation on the camera body 11 side. The angle of view of the imaging optical system 22 can be magnified by moving the second imaging optical system 22B.

The stop unit 55 moves a plurality of stop leaf blades 55A by driving of the motor 65 to change an amount of light incident on the imaging element 16. The motor driver 63 controls the driving of the motors 64 and 65 based on the control of the lens controller 61.

The camera body controller 71 comprises a CPU, a ROM that stores programs or parameters used in the CPU, and a RAM used as a work memory of the CPU (none of which is shown). The camera body controller 71 controls the camera body 11 and each unit of the lens barrel 12 connected to the camera body 11. A release signal is input to the camera body controller 71 from the release switch 14. Moreover, the body-side signal contact 17 is connected to the camera body controller 71.

The lens-side signal contact 25 comes into contact with the body-side signal contact 17 in a case in which the lens mount 24 of the lens barrel 12 is mounted on the lens mount 13 of the camera body 11, and the lens barrel 12 and the camera body 11 are electrically connected to each other.

A shutter unit 72 is a so-called focal plane shutter, and is disposed between the lens mount 13 and the imaging element 16. The shutter unit 72 is provided to be able to block an optical path between the imaging optical system 22 and the imaging element 16, and is changed between an opened state and a closed state. The shutter unit 72 is put into the opened state in a case of capturing a live view image and a video. In a case of capturing a still image, the shutter unit 72 is temporarily put into the closed state from the opened state. The shutter unit 72 is driven by a shutter motor 73. The motor driver 74 controls the driving of the shutter motor 73.

The imaging element 16 is driven and controlled by the camera body controller 71. The imaging element 16 has a light-receiving surface configured by a plurality of pixels (not shown) arranged in a two-dimensional matrix. Each pixel includes a photoelectric conversion element, and performs photoelectric conversion of a subject image imaged on the light-receiving surface by the imaging optical system 22 to generate an imaging signal.

Moreover, the imaging element 16 comprises a signal processing circuit (none of which is shown), such as a noise removal circuit, an auto gain controller, and an A/D conversion circuit. The noise removal circuit performs noise removal processing on the imaging signal. The auto gain controller amplifies a level of the imaging signal to an optimum value. The A/D conversion circuit converts the imaging signal into a digital signal and outputs the converted signal from the imaging element 16 to a busline 76. The output signal of the imaging element 16 is image data (so-called RAW data) having one color signal for each pixel.

An image memory 75 stores image data for one frame output to the busline 76. An image data processing unit 77 reads out the image data for one frame from the image memory 75 and performs known image processing, such as matrix operation, demosaicing processing, γ correction, brightness/color difference conversion, and resizing processing.

An LCD driver 78 sequentially inputs the image data for one frame subjected to the image processing by the image data processing unit 77 to an image display unit 79. The image display unit 79 is provided, for example, on a rear surface of the camera body 11 and sequentially displays the live view images at regular intervals. A card interface (I/F) 81 is incorporated in a card slot (not shown) provided in the camera body 11 and is electrically connected to a memory card 82 inserted in the card slot. The card I/F 81 stores the image data subjected to the image processing by the image data processing unit 77 in the memory card 82. Moreover, in a case in which the image data stored in the memory card 82 is reproduced and displayed, the card I/F 81 reads out the image data from the memory card 82.

The camera body controller 71 transmits a control signal for driving the first imaging optical system 22A, that is, the focus lens 51, to the lens controller 61 in accordance with a phase difference detected by the AF processing unit 83 described below. Based on the control signal, the lens controller 61 controls the piezoelectric element drive driver 62 to move the first imaging optical system 22A, and detects the position of the first imaging optical system 22A by the position detection sensor 35. Then, the lens controller 61 moves the first imaging optical system 22A to a position at which the phase difference detected by the AF processing unit 83 is the minimum value.

The camera body controller 71 operates the stop unit 55 in accordance with exposure information calculated by an automatic exposure (AE) processing unit 84 described below, and transmits a control signal for changing a stop diameter to the lens controller 61. The lens controller 61 controls the motor driver 74 based on the control signal, and controls the stop diameter of the stop unit 55 to obtain a stop value calculated by the AE processing unit 84.

The AE processing unit 84 calculates an integrated value of each color signal from the image data for one frame. The camera body controller 71 calculates an appropriate exposure value based on the integrated value calculated for each image for one frame, and decides the stop value to be an appropriate exposure value calculated with respect to a preset shutter speed. The camera body controller 71 transmits the control signal to the lens controller 61. The lens controller 61 controls the motor driver 74 based on the control signal, and operates the stop unit 55 at the stop diameter at which the decided stop value is obtained.

The AF processing unit 83 detects the phase difference by a pupil division method from the image data for one frame. It should be noted that, since the technology of the focus adjustment by the phase difference detection is well known, the detailed description thereof will be omitted. The camera body controller 71 detects the position (focus position) of the first imaging optical system 22A at which the phase difference is the minimum value based on the phase difference calculated each time the image for one frame is obtained from the AF processing unit 83 and the position of the first imaging optical system 22A detected by the position detection sensor 35. The camera body controller 71 moves the first imaging optical system 22A to the detected focus position, and stops the movement of the first imaging optical system 22A. In this way, the focus adjustment is automatically performed without any operation by a user.

It should be noted that the AF processing performed by the camera body controller 71 and the AF processing unit 83 is not limited to the focus adjustment by the phase difference detection, and may be contrast type focus adjustment. In this case, the AF processing unit 83 calculates an AF evaluation value, which is an integrated value of high-frequency components, from the image data for one frame. The camera body controller 71 detects the position (focus position) of the first imaging optical system 22A at which the AF evaluation value is the maximum value based on the AF evaluation value calculated each time the image for one frame is obtained from the AF processing unit 83 and the position of the first imaging optical system 22A detected by the position detection sensor 35. The following is the same as in the case of the phase difference detection, the camera body controller 71 moves the first imaging optical system 22A to the detected focus position, and stops the movement of the first imaging optical system 22A.

The operation of the digital camera 10 according to the present embodiment will be described. In a state in which the power switch (not shown) is operated by the user who is an imager to turn on the power, the power is supplied to each unit of the digital camera 10.

In a state in which the power of the digital camera 10 is turned on, the imaging element 16, the camera body controller 71, the AF processing unit 83, the lens controller 61, the piezoelectric element drive driver 62, the piezoelectric element 31, the position detection sensor 35, and the like are activated to perform the focus adjustment. As described above, in a case in which the control signal from the camera body controller 71 is received, the lens controller 61 moves the first imaging optical system 22A within the movement range RM. Then, the lens controller 61 stops the first imaging optical system 22A in a case in which the focus position is detected. In this way, in a case in which the lens controller 61 receives the signal for instructing the power of the drive device 23 to be turned on, the first imaging optical system 22A is within the movement range RM, that is, at the first position.

Then, in a case in which the user finishes the imaging with the digital camera 10 and in a state in which the power is turned off, the focus adjustment operation described above is also finished. As described above, in a case in which the stop signal from the camera body controller 71 is received, the lens controller 61 performs the control of moving the first imaging optical system 22A from the movement range RM (that is, the first position) to the second position. In a case in which the first imaging optical system 22A is stopped at the second position, the power supply to each unit of the digital camera 10 is stopped.

As described above, in the drive device 23, the first imaging optical system 22A is provided to receive the vibration of the piezoelectric element 31 and to be movable in the range including at least the first position and the second position, and the lens controller 61 performs the control of moving the first imaging optical system 22A from the first position to the second position in a case in which a signal for instructing the power of the drive device 23 to be turned off is received. Since the second position is a position other than the movement range RM, for example, in a case in which the digital camera 10 receives the vibration or the impact, even in a case in which an engagement portion of the drive shaft 32 with the engagement member 33 may have a damage or a recess, there is no influence on the operation of the first imaging optical system 22A. That is, the drive device 23 can suppress, to the minimum, the damage to the drive shaft 32 that occurs in a case in which the power is turned off, and can ensure good operability.

First Modification Example

Figure 15:
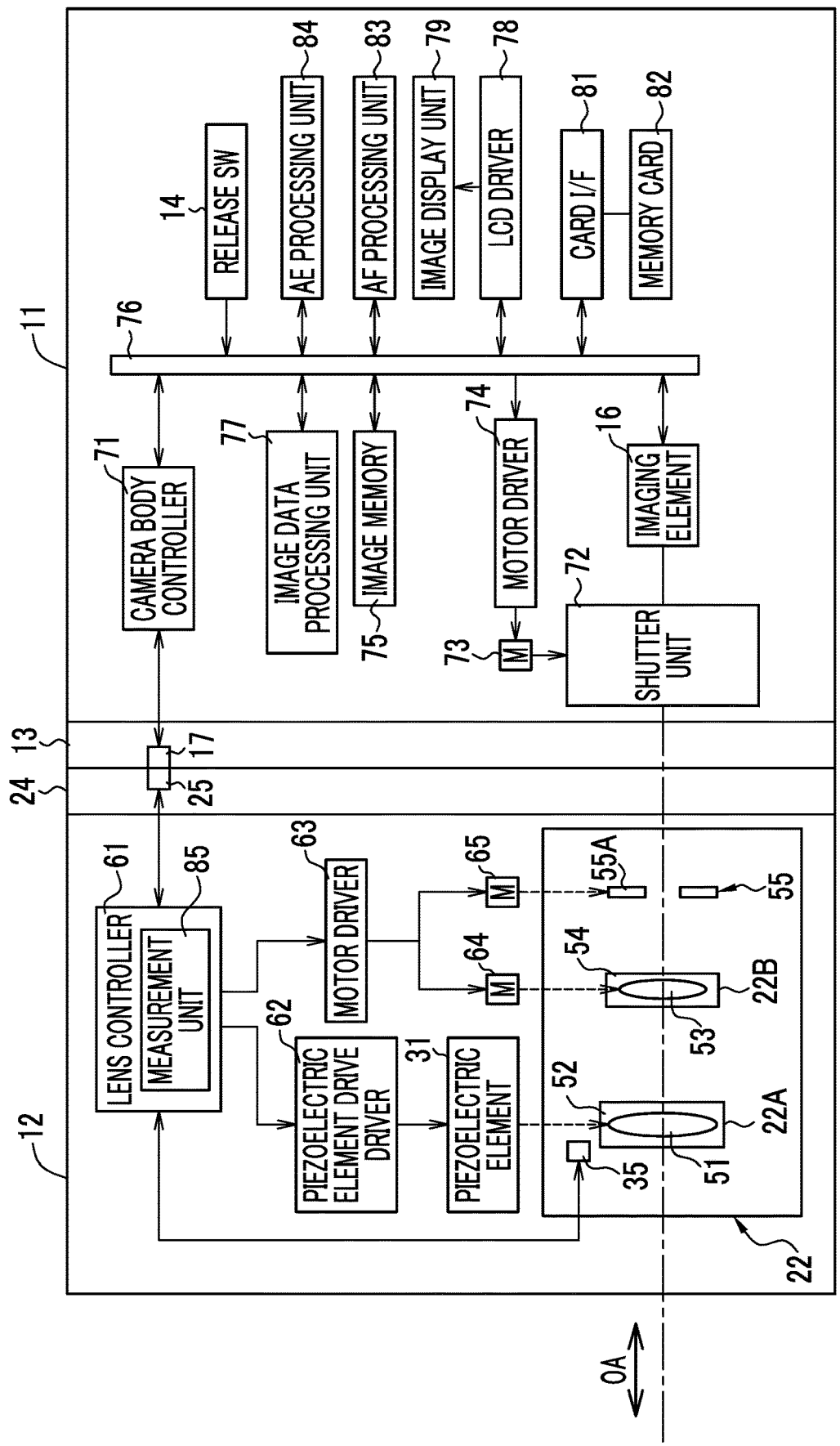
FIG. 15 is a block diagram showing a schematic configuration of a first modification example.

In the first embodiment, the example has been described in which the control of moving the first imaging optical system 22A from the first position to the second position is performed in a case in which a signal for instructing the power of the drive device 23 to be turned off is received, but the present invention is not limited to this, and control of moving the imaging optical system from the first position to the second position may be performed based on a time during which the piezoelectric element 31 is in a stop state. In this case, as shown in FIG. 15, the digital camera 10 is provided with a measurement unit that measures the time of the stop state.

In the first modification example, the lens controller 61 has a function of a measurement unit 85. The measurement unit 85 measures the time of the stop state, for example, a time during which the stop signals continuously transmitted from the camera body 11 side are received. The lens controller 61 performs the control of moving the first imaging optical system 22A from the first position to the second position in a case in which the time during which the stop signal is received exceeds a certain threshold value. It should be noted that the configuration of the measurement unit 85 is not limited to this, and the measurement unit 85 may be provided in the camera body controller 71, or a timer integrated circuit (IC) may be provided separately from the lens controller 61 and the camera body controller 71.

Second Embodiment

In the first embodiment, the second position is disposed only on the base end side of the movement range for imaging, but the present invention is not limited to this, and as shown in portions (A) and (B) in FIG. 16, second positions P22 are positions on outer sides of both ends of the movement range RM in the second embodiment described below.

In a drive device 91 according to the present embodiment, the second positions are provided on outer sides of both ends of the drive shaft 32 to make a drive shaft 92, a holding member 93, a guide shaft, and the like longer than the drive shaft 32, the holding member 34, the guide shaft 36, and the like in the first embodiment. However, the present embodiment is the same as the first embodiment and the first modification example except for these differences, so that the description thereof will be omitted. In addition, in the portions (A) and (B) in FIG. 16, for convenience of description, each component is shown in a simplified manner.

Figure 16:
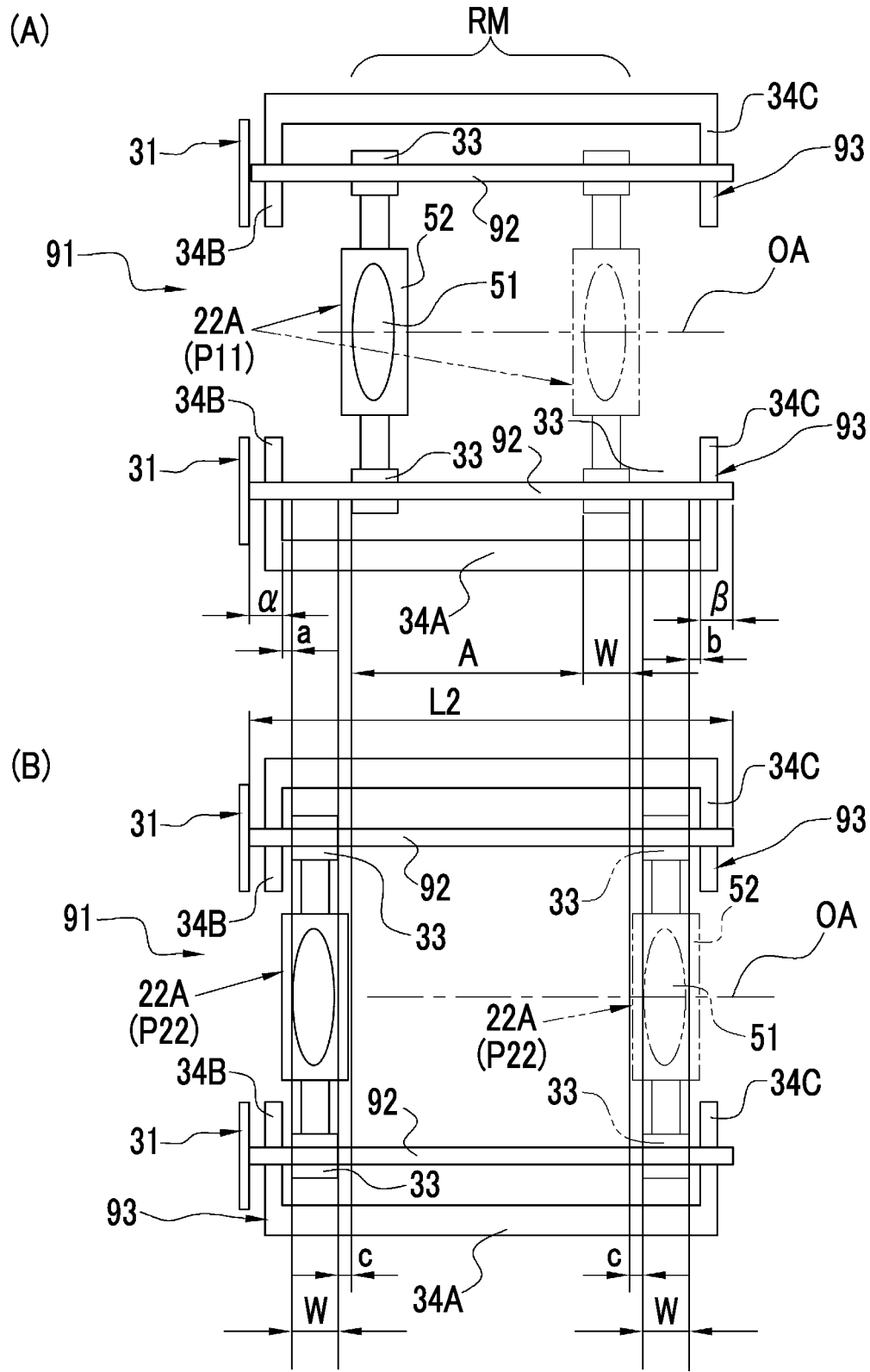
FIG. 16 is an explanatory diagram showing a relationship between a length of a drive shaft and a movement range in a second embodiment.

As shown in the portion (A) in FIG. 16, the first position P11 is the position within the movement range RM, as in the first embodiment. Moreover, as in the first embodiment, in a case in which the focus adjustment is performed by the control of the camera body controller 71 and the autofocus (AF) processing unit 83, the movement range RM is the movement range for imaging in which the first imaging optical system 22A is moved.

As shown in the portion (B) in FIG. 16, the second position P22 is a position other than the movement range RM in the range in which the first imaging optical system 22A is engaged with the drive shaft 92 via the engagement member 33. In the present embodiment, the positions on the distal end side and the base end side of the movement range RM are the second positions P22. The lens controller 61 performs control of moving the first imaging optical system 22A from the first position to the second position in a case in which a signal for instructing the power of the drive device 91 to be turned off is received. It should be noted that, as in the first embodiment, the stop signal (control signal for stopping the drive device 91) from the camera body controller 71 corresponds to the signal for instructing the power of the drive device 91 to be turned off.

Moreover, a length L2 of the drive shaft 92 in the present embodiment is longer than the length L1 of the drive shaft 32 in the first embodiment by the engagement length W of the engagement between the engagement member 33 and the drive shaft 92 and the gap c between the engagement member 33 and the movement range RM in a case in which the first imaging optical system 22A is at the second position P22. That is, the length L2 of the drive shaft $32=\alpha+a+W+c+W+A+c+W+b+\beta$. Therefore, at least a relationship of L2>A+3W is needed.

In the present embodiment, since there are two second positions P22, in a case in which the signal for instructing the power to be turned off is received, the lens controller 61 determines the second position P22 that is closer to the first position P11 at which the first imaging optical system 22A is located, from position information by the position detection sensor 35. Then, the lens controller 61 performs control of moving the first imaging optical system 22A to the second position P22 closer to the first position P11 at which the first imaging optical system 22A is located. As a result, in a case in which the drive device 23 receives the signal for instructing the power to be turned off, the movement amount for moving the first imaging optical system 22A is reduced. Therefore, in addition to the effects of the first embodiment, a probability of the drive shaft 32 being damaged in the movement range RM is further reduced, and a time until the power is turned off is shortened, and good operability can be ensured.

Second Modification Example

Figure 17A:
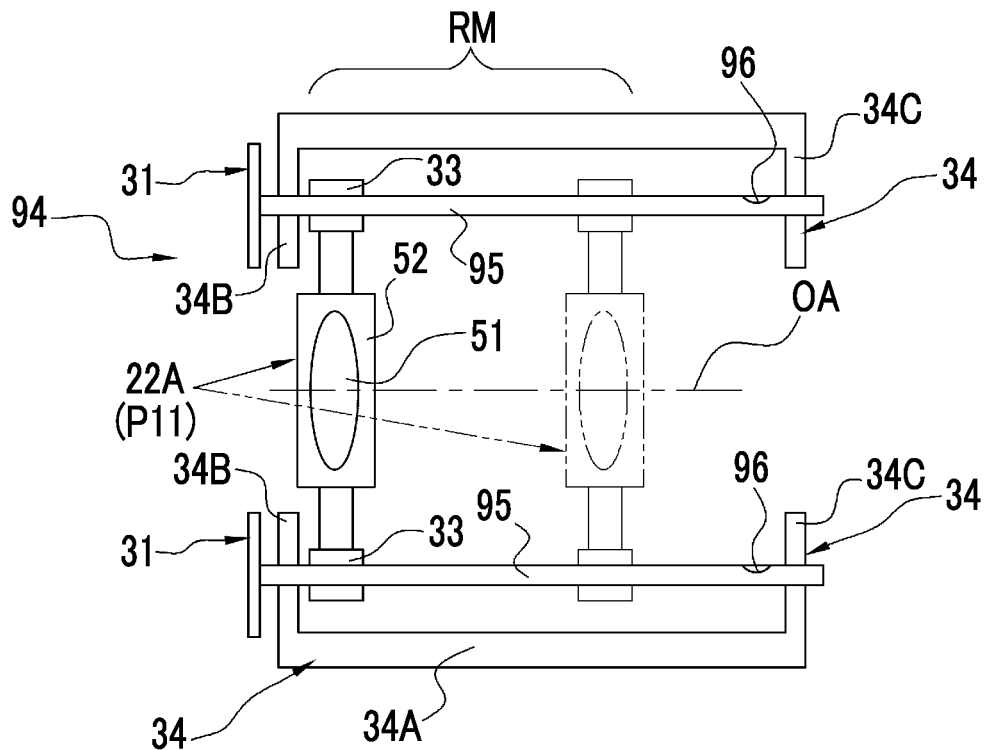
FIGS. 17A and 17B are explanatory diagrams showing a relationship between a lubricant reservoir portion and a movement range in a second modification example.
Figure 17B:
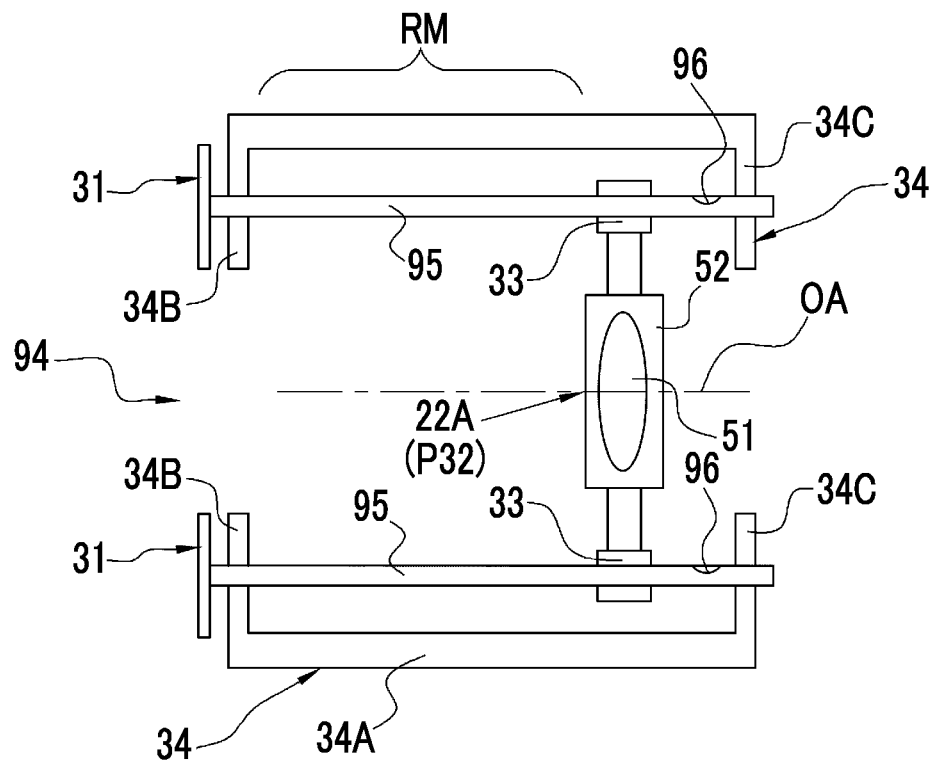

Moreover, as a modification example of each of the embodiments described above, as in the drive device 94 shown in FIGS. 17A and 17B, a lubricant reservoir portion 96 for retaining a lubricant may be provided in a track of the drive shaft 95, a second position P32 at which the first imaging optical system 22A is moved may be a position closer to the movement range RM than the lubricant reservoir portion 96 in the optical axis OA direction. It should be noted that the lubricant reservoir portion 96 is, for example, a recessed portion that is recessed from an outer peripheral surface of the drive shaft 95. Moreover, the configurations other than the lubricant reservoir portion 96 and the second position P32 are the same as the configurations of each of the embodiments described above, and the description thereof will be omitted.

Third Modification Example

Figure 18A:
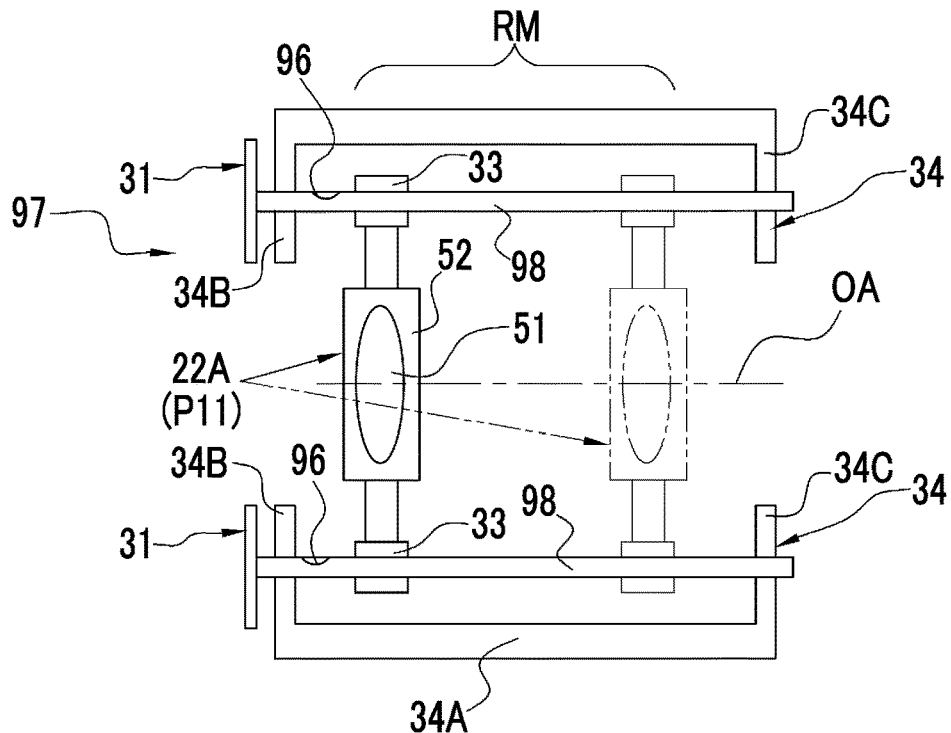
FIGS. 18A and 18B are explanatory diagrams showing a relationship between a lubricant reservoir portion and a movement range in a third modification example.
Figure 18B:
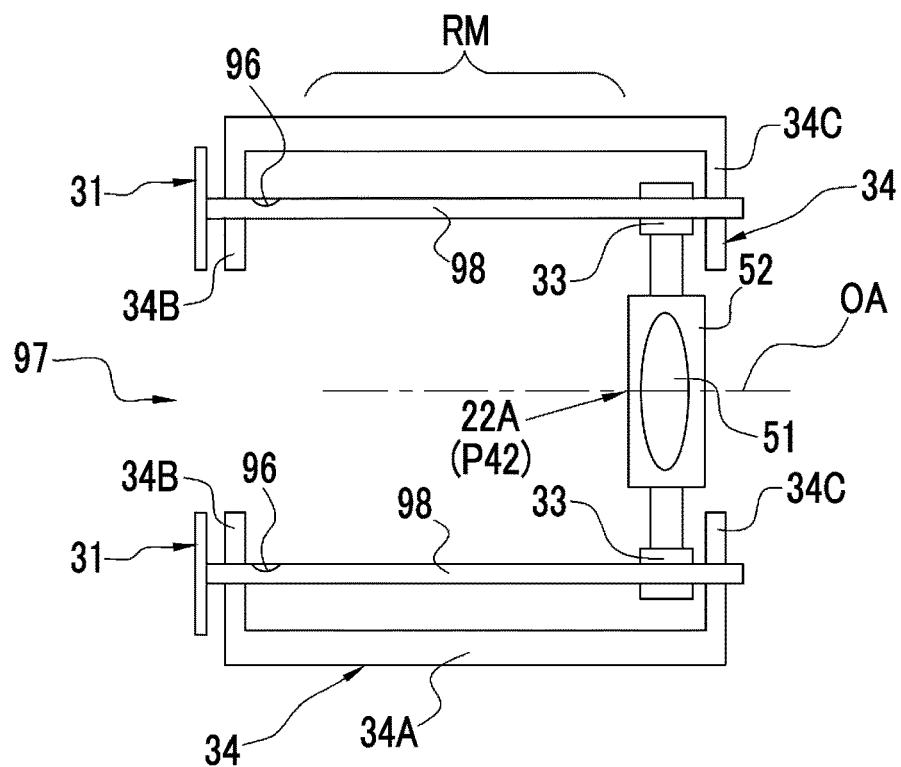

Moreover, as another modification example, as in the drive device 97 shown in FIGS. 18A and 18B, the lubricant reservoir portion 96 for retaining the lubricant may be provided on the track of the drive shaft 98, and a second position P42 at which the first imaging optical system 22A is moved may be interposed between the movement ranges RM and may be a position on the side opposite to the lubricant reservoir portion 96 in the optical axis OA direction. It should be noted that the lubricant reservoir portion 96 is the same as the lubricant reservoir portion 96 of the second modification example. Moreover, the configurations other than the lubricant reservoir portion 96 and the second position P42 are the same as the configurations of each of the embodiments described above, and the description thereof will be omitted.

Moreover, in each of the embodiments described above, diameters of the drive shafts 32, 92, 95, and 98 are not mentioned, in a case in which the diameter of the drive shaft 32 in a portion that is frictionally engaged with the engagement member 33 in a case in which the first imaging optical system 22A is located at the first position is denoted by a first diameter R1, and the diameter of the drive shafts 32, 92, 95, and 98 in a portion that is frictionally engaged with the engagement member 33 in a case in which the first imaging optical system 22A is located at the second position is denoted by a second diameter R2, it is preferable that the first diameter R1 be smaller than the second diameter R2.

Alternatively, in a case in which a frictional force between the drive shafts 32, 92, 95, and 98 and the engagement member 33 in a portion that is frictionally engaged with the engagement member 33 in a case in which the first imaging optical system 22A is located at the first position is denoted by a first frictional force F1, and a frictional force between the drive shafts 32, 92, 95, and 98 and the engagement member 33 in a portion that is frictionally engaged with the engagement member 33 in a case in which the first imaging optical system 22A is located at the second position is denoted by a second frictional force F2, it is preferable that the first frictional force F1 be smaller than the second frictional force F2.

In each of the embodiments described above, as the piezoelectric element 31, the bimorph type piezoelectric element including the electrode layers on both surfaces of the piezoelectric body having the outer shape formed in the disk shape is used, but the present invention is not limited to this, and a unimorph type piezoelectric element including the electrode layer on only one surface may be used, or a lamination type piezoelectric element which is composed of laminated piezoelectric bodies and contracts in a direction in which the piezoelectric bodies are laminated may be used.

In each of the embodiments described above, the hardware structure of the processing unit that executes various types of processing, such as the lens controller 61 and the camera body controller 71, is various processors as shown below. The various processors include a central processing unit (CPU), which is a general-purpose processor that executes software (program) and functions as various processing units, a graphical processing unit (GPU), a programmable logic device (PLD), which is a processor of which a circuit configuration can be changed after the manufacture, such as a field programmable gate array (FPGA), and a dedicated electric circuit, which is a processor having a circuit configuration specifically designed to execute various types of processing.

One processing unit may be composed of one of these various processors, or may be composed of a combination of two or more same or different types of processors (for example, a plurality of FPGAs, a combination of a CPU and an FPGA, or a combination of a CPU and a GPU). Moreover, a plurality of the processing units may be composed of one processor. As an example in which the plurality of processing units are composed of one processor, first, there is a form in which one processor is composed of a combination of one or more CPUs and software, and this processor functions as the plurality of processing units, as represented by a computer, such as a client or a server. Second, as represented by a system on chip (SoC) or the like, there is a form in which a processor, which realizes the functions of the entire system including the plurality of processing units with a single integrated circuit (IC) chip, is used. In this way, various processing units are composed of one or more of the various processors described above as the hardware structure.

More specifically, the hardware structure of these various processors is an electric circuit (circuitry) in a form of a combination of circuit elements, such as semiconductor elements.

It should be noted that, in each of the embodiments described above, the first imaging optical system 22A including the focus lens 51 is described as the imaging optical system, but the present invention is not limited to this and may be applied to an imaging optical system including a zoom lens. Moreover, the present invention can be applied to an imaging apparatus, such as a smartphone or a video camera, in addition to the digital camera.

EXPLANATION OF REFERENCES

10: digital camera
11: camera body
11A: grip portion
12: lens barrel
13: lens mount
13A: imaging aperture
14: release switch
16: imaging element
17: body-side signal contact
21: lens barrel body
22: imaging optical system
22A: first imaging optical system
22B: second imaging optical system
24: lens mount
25: lens-side signal contact
26: attachment member
27: attachment member
28: attachment opening portion
31: piezoelectric element
32: drive shaft
33: engagement member
34: holding member
34A: pillar portion
34B, 34C: holding piece 34D, 34E: through-hole
34F: bearing member
34G: rib
35: position detection sensor
36: guide shaft
37: flexible substrate
38: first member
38A: connecting portion
38B: reception portion
38C: groove
38D: positioning protrusion
38E: screw hole
38F: screw hole
39: second member
39A: pressing piece
39B: positioning opening
39C: screw hole
41: screw member
43: magnet
44: magnetic sensor
51: focus lens
52: lens holding frame
52A: screw hole
52B: boss
52C: guide hole
53: zoom lens
54: lens holding frame
55: stop unit
55A: stop leaf blade
61: lens controller
62: piezoelectric element drive driver
63: motor driver
64, 65: motor
71: camera body controller
72: shutter unit
73: shutter motor
74: motor driver
75: image memory
76: busline
77: image data processing unit
78: LCD driver
79: image display unit
81: card i/F (interface)
82: memory card
83: AF (autofocus) processing unit
84: AE (automatic exposure) processing unit
85: measurement unit
91: drive device
92: drive shaft
93: holding member
94: drive device
95: drive shaft
96: lubricant reservoir portion
97: drive device
98: drive shaft
D1: displacement amount
L1: length
L2: length
OA: optical axis
P0: initial position
P11: first position
P12: second position
P22: second position
P32: second position
P42: second position
RM: movement range

What is claimed is:

1. A drive device that drives an imaging optical system, the device comprising:
a piezoelectric element;
a drive shaft that receives vibration of the piezoelectric element and vibrates along an optical axis direction of the imaging optical system;
an engagement member that is frictionally engaged with the drive shaft and is connected to the imaging optical system; and
a processor that controls vibration of the piezoelectric element,
wherein the imaging optical system is provided to receive vibration of the piezoelectric element and to be movable in a range including at least a first position and a second position,
the processor performs control of moving the imaging optical system from the first position to the second position in a case in which a signal for instructing a power of the drive device to be turned off is received,
the first position is a position within a movement range for imaging that guarantees optical accuracy of the imaging optical system,
the second position is a position other than the movement range for imaging in a range in which the imaging optical system is engaged with the drive shaft via the engagement member,
the second positions are located on outer sides of both ends of the movement range for imaging, and
the processor performs control of moving the imaging optical system to the second position that is closer to the first position at which the imaging optical system is located among the second positions located on the outer sides of both ends in a case in which the signal for instructing the power to be turned off is received.

2. The drive device according to claim 1,
wherein the processor performs control of moving the imaging optical system from the first position to the second position based on a time during which the piezoelectric element is in a stop state.

3. The drive device according to claim 1,
wherein the first position is a position within a movement range in which the imaging optical system is moved in a case in which a signal for instructing the power of the drive device to be turned on is received, and
the second position is a position other than the movement range in a range in which the imaging optical system is engaged with the drive shaft via the engagement member.

4. The drive device according to claim 1,
wherein, in a case in which a maximum movement amount of movement of the imaging optical system within the movement range for imaging in the optical axis direction is denoted by A, an engagement length of engagement between the engagement member and the drive shaft is denoted by W, and a length of the drive shaft is denoted by L, a relationship of $L > A + 3W$ is satisfied.

5. The drive device according to claim 1,
wherein, in a case in which a frictional force between the drive shaft and the engagement member in a portion that is frictionally engaged with the engagement member in a case in which the imaging optical system is located at the first position is denoted by a first frictional force, and a frictional force between the drive shaft and the engagement member in a portion that is frictionally engaged with the engagement member in a case in which the imaging optical system is located at the second position is denoted by a second frictional force, the first frictional force is smaller than the second frictional force.

6. The drive device according to claim 1, wherein the drive shaft is a carbon shaft.

7. An imaging apparatus comprising:

the drive device according to claim 1; and the imaging optical system.

8. A drive device that drives an imaging optical system, the device comprising:

a piezoelectric element;

a drive shaft that receives vibration of the piezoelectric element and vibrates along an optical axis direction of the imaging optical system;

an engagement member that is frictionally engaged with the drive shaft and is connected to the imaging optical system; and a processor that controls vibration of the piezoelectric element, wherein the imaging optical system is provided to receive vibration of the piezoelectric element and to be movable in a range including at least a first position and a second position, the processor performs control of moving the imaging optical system from the first position to the second position in a case in which a signal for instructing a power of the drive device to be turned off is received, the first position is a position within a movement range for imaging that guarantees optical accuracy of the imaging optical system, the second position is a position other than the movement range for imaging in a range in which the imaging optical system is engaged with the drive shaft via the engagement member, and in a case in which a maximum movement amount of movement of the imaging optical system within the movement range for imaging in the optical axis direction is denoted by A, an engagement length of engagement between the engagement member and the drive shaft is denoted by W, and a length of the drive shaft is denoted by L, a relationship of $L > A + 2W$ is satisfied.

9. A drive device that drives an imaging optical system, the device comprising:

a piezoelectric element;

a drive shaft that receives vibration of the piezoelectric element and vibrates along an optical axis direction of the imaging optical system;

an engagement member that is frictionally engaged with the drive shaft and is connected to the imaging optical system; and a processor that controls vibration of the piezoelectric element, wherein the imaging optical system is provided to receive vibration of the piezoelectric element and to be movable in a range including at least a first position and a second position, the processor performs control of moving the imaging optical system from the first position to the second position in a case in which a signal for instructing a power of the drive device to be turned off is received, the first position is a position within a movement range for imaging that guarantees optical accuracy of the imaging optical system, the second position is a position other than the movement range for imaging in a range in which the imaging optical system is engaged with the drive shaft via the engagement member, a lubricant reservoir portion for retaining a lubricant is provided on a track of the drive shaft, and the second position is located closer to the movement range for imaging than the lubricant reservoir portion in the optical axis direction.

10. A drive device that drives an imaging optical system, the device comprising:

a piezoelectric element;

a drive shaft that receives vibration of the piezoelectric element and vibrates along an optical axis direction of the imaging optical system;

an engagement member that is frictionally engaged with the drive shaft and is connected to the imaging optical system; and a processor that controls vibration of the piezoelectric element, wherein the imaging optical system is provided to receive vibration of the piezoelectric element and to be movable in a range including at least a first position and a second position, the processor performs control of moving the imaging optical system from the first position to the second position in a case in which a signal for instructing a power of the drive device to be turned off is received, the first position is a position within a movement range for imaging that guarantees optical accuracy of the imaging optical system, the second position is a position other than the movement range for imaging in a range in which the imaging optical system is engaged with the drive shaft via the engagement member, a lubricant reservoir portion for retaining a lubricant is provided on a track of the drive shaft, and the second position is located on a side opposite to the lubricant reservoir portion in the optical axis direction with the movement range for imaging interposed therebetween.

* * * * *